United States Patent [19]
Yin et al.

[11] Patent Number: 5,313,231
[45] Date of Patent: May 17, 1994

[54] COLOR PALETTE DEVICE HAVING BIG/LITTLE ENDIAN INTERFACING, SYSTEMS AND METHODS

[75] Inventors: Chenwei J. Yin, Richardson; Richard C. Nail; Louis J. Izzi, both of Plano; Edison H. Chiu, Richardson, all of Tex.

[73] Assignee: Texas Instruments Incorporated, Dallas, Tex.

[21] Appl. No.: 856,431

[22] Filed: Mar. 24, 1992

[51] Int. Cl.$^5$ .................................... G09G 1/28
[52] U.S. Cl. ........................ 345/199; 345/155
[58] Field of Search ........... 340/703, 701, 799, 798, 340/750; 345/199, 186, 187, 188, 150, 153, 154, 155

[56] References Cited

U.S. PATENT DOCUMENTS

| | | | |
|---|---|---|---|
| 4,769,632 | 9/1988 | Work et al. | 340/701 |
| 4,789,854 | 12/1988 | Ishii | 340/703 |
| 4,799,053 | 1/1989 | Van Aken et al. | 340/703 |
| 4,808,989 | 2/1989 | Tabata et al. | 340/703 |
| 4,815,033 | 3/1989 | Harris | 364/900 |
| 4,959,779 | 9/1990 | Weber et al. | 364/200 |
| 5,059,955 | 10/1991 | Yamamura | 340/703 |
| 5,068,644 | 11/1991 | Batson et al. | 340/701 |
| 5,095,301 | 3/1992 | Guttag et al. | 340/701 |
| 5,107,415 | 4/1992 | Sato et al. | 395/800 |
| 5,132,898 | 7/1992 | Sakamura et al. | 395/425 |

OTHER PUBLICATIONS

Brooktree, "B2459", *Product Data Book 1989*, 1989, pp. 5-85 through 5-115.
Texas Instruments Incorporated, "TMS34070-20 Color Palette", *Production Data*, 1986, pp. 1-15.
Brooktree, "RAMDAC Products", *Winter 1990 Product Selection Guide*, Winter, 1990, pp. 9-15.

*Primary Examiner*—Ulysses Weldon
*Attorney, Agent, or Firm*—Robert D. Marshall, Jr.; James C. Kesterson; Richard L. Donaldson

[57] ABSTRACT

A color palette is provided having a plurality input terminals for receiving a plurality of bits of data having an order. A two color path is included which comprises first circuitry coupled to the input terminals for selectively reversing the order of the plurality of bits of data. Second circuitry is coupled to the first circuitry and is operable in a first mode to pass all of the plurality of bits of data received from the first circuitry and in a second mode has at least one word comprising selected ones of the plurality of bits, the selected ones of the bits having a bit order. The third circuitry is provided coupled to the second circuitry and operable to pass all of the bits of data received from the second circuitry in the first mode and operable to selectively reverse the ordering of the selected ones of the bits and pass be at least one word received from the second circuitry in the second mode. The fourth circuitry is further provided coupled to the third circuitry inoperable to receive bits of data passed from the circuitry and select for output as at least one word of true color data at least some of the bits.

22 Claims, 31 Drawing Sheets

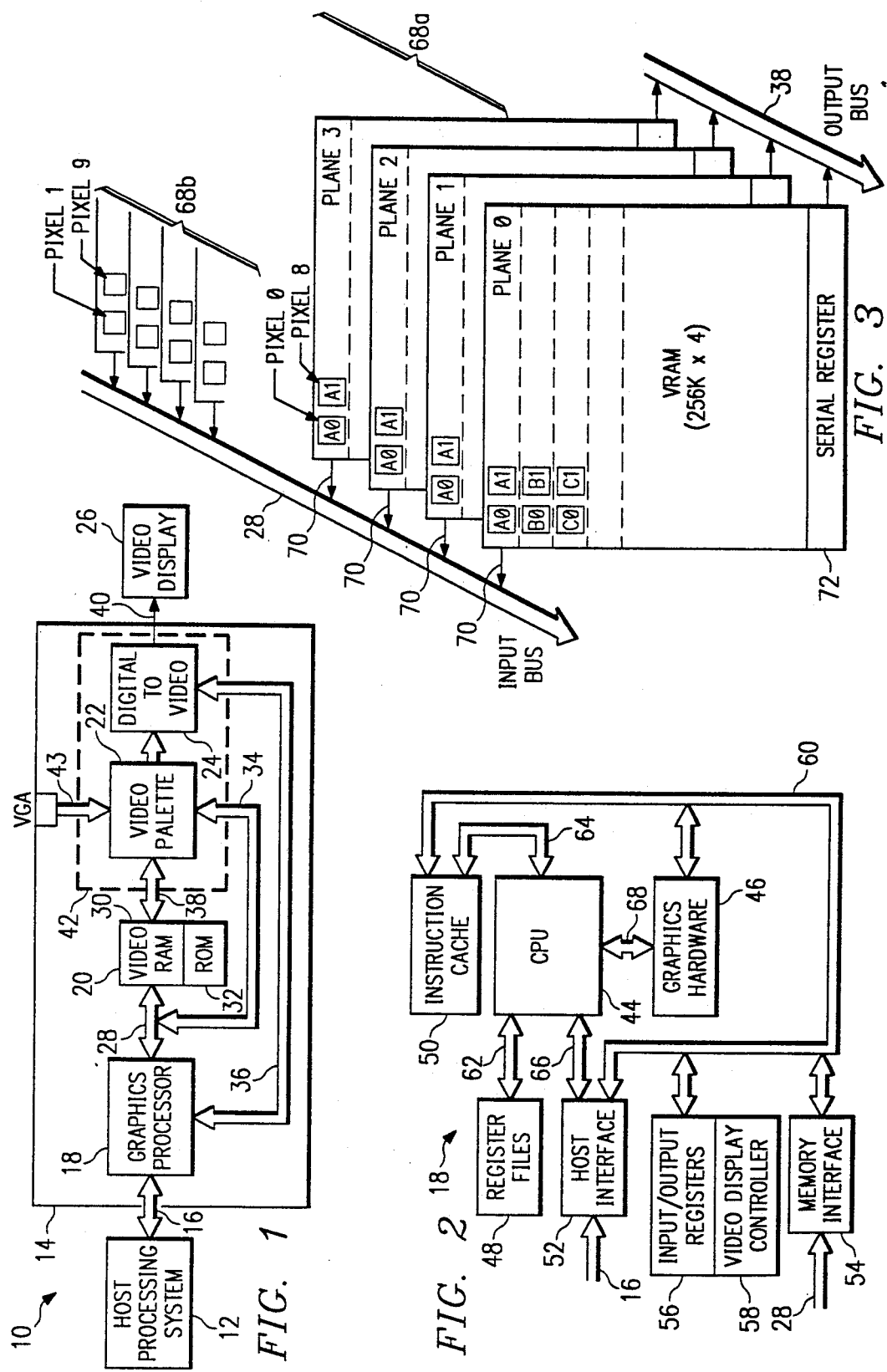

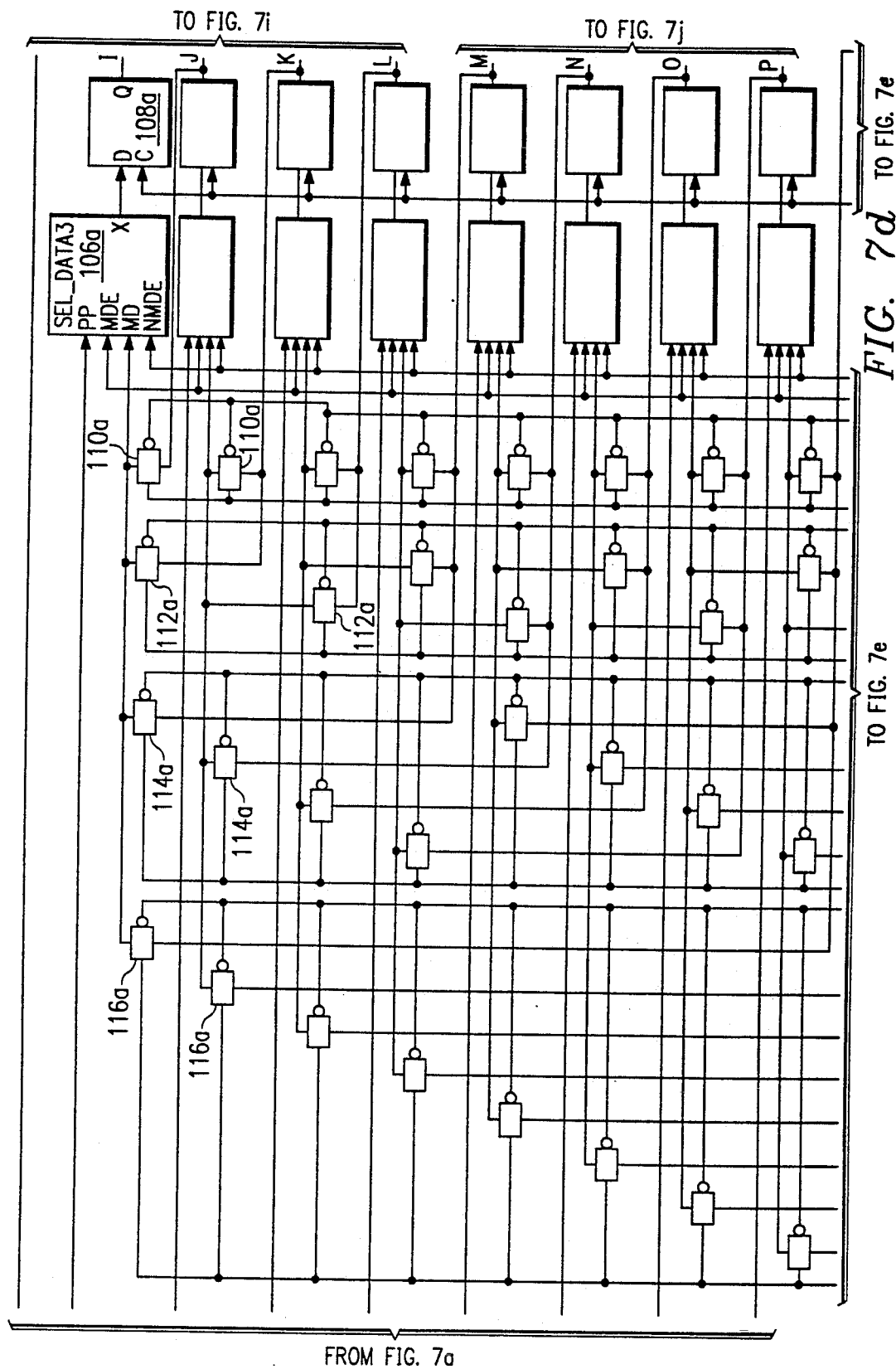

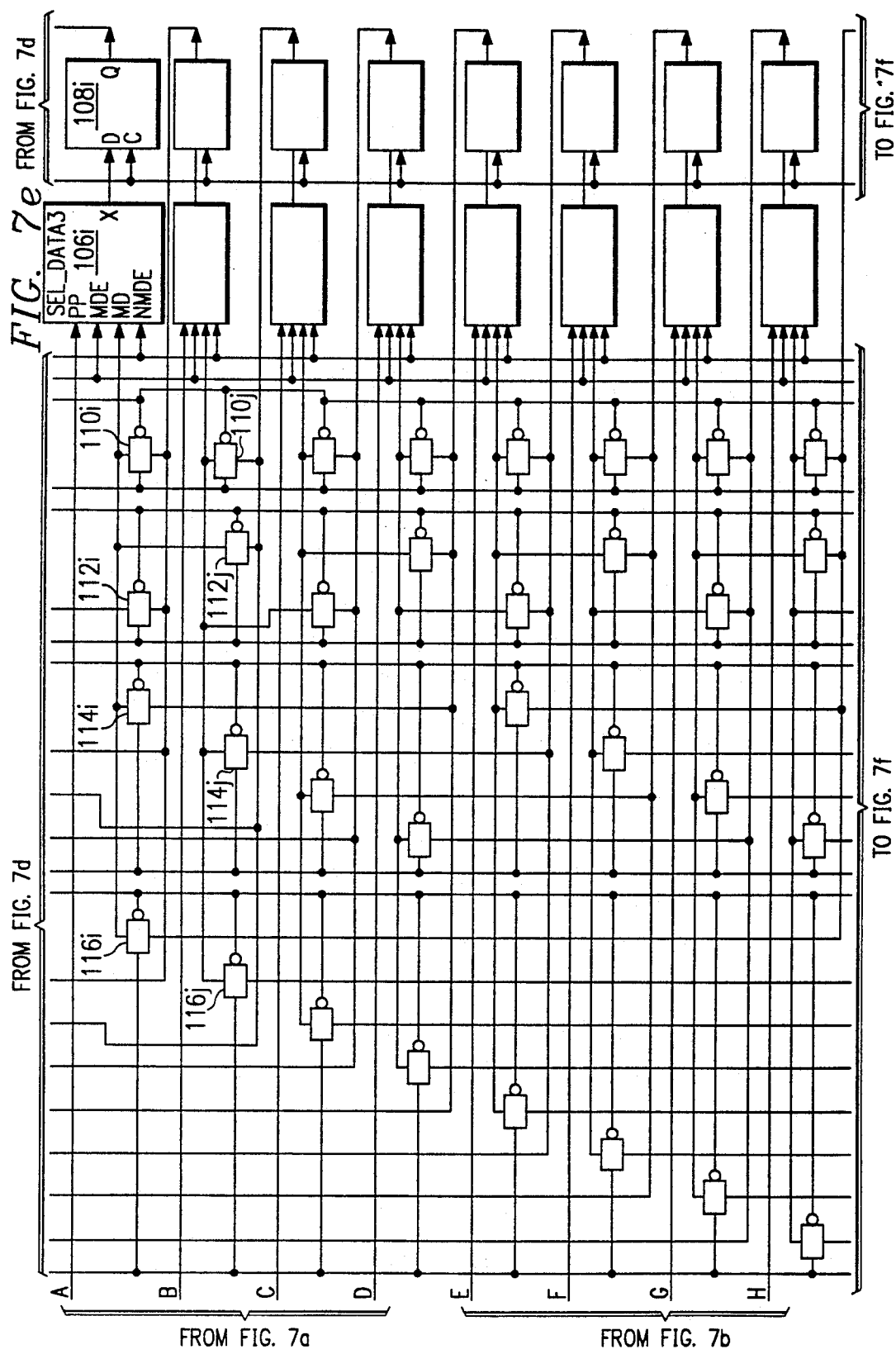

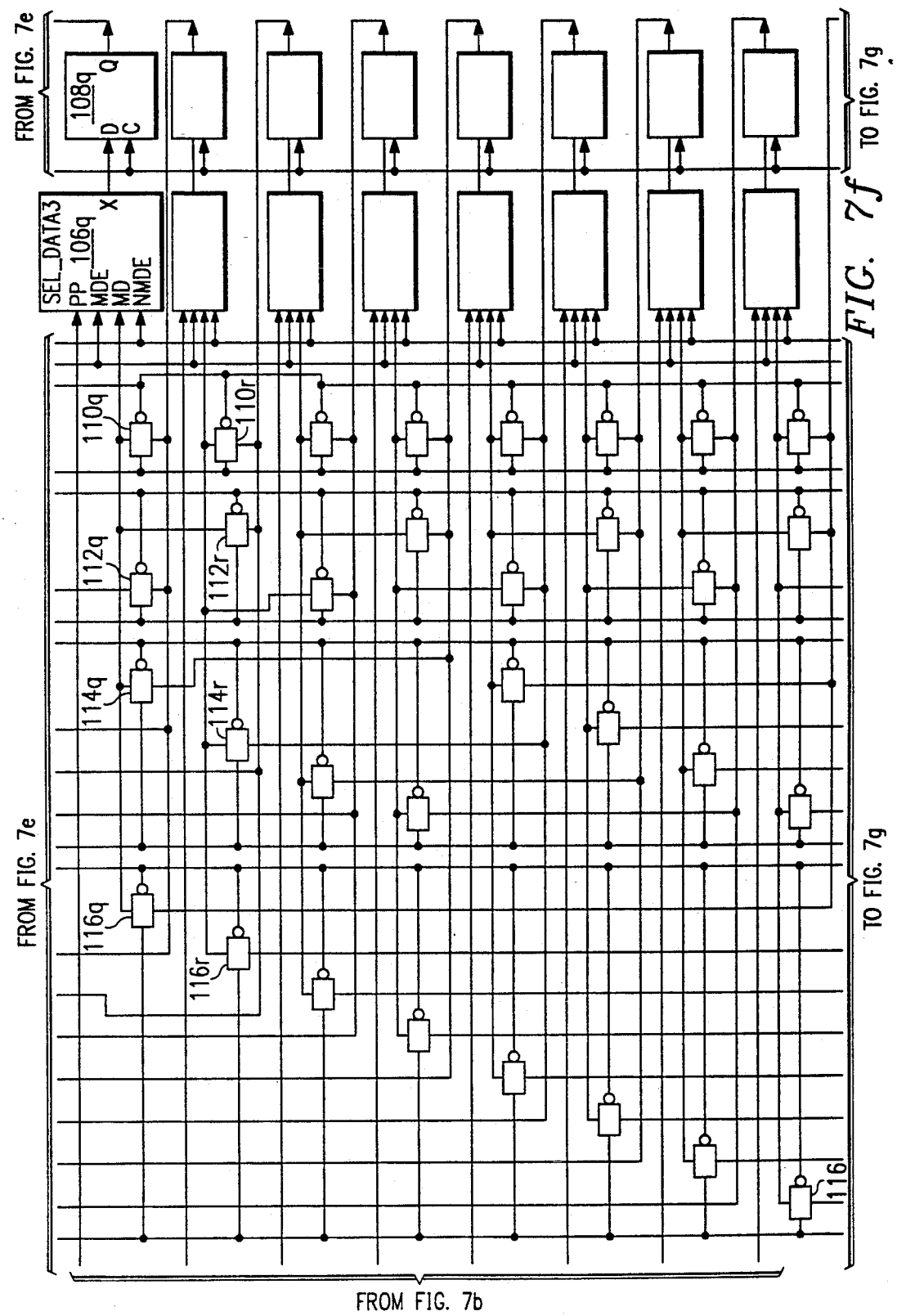

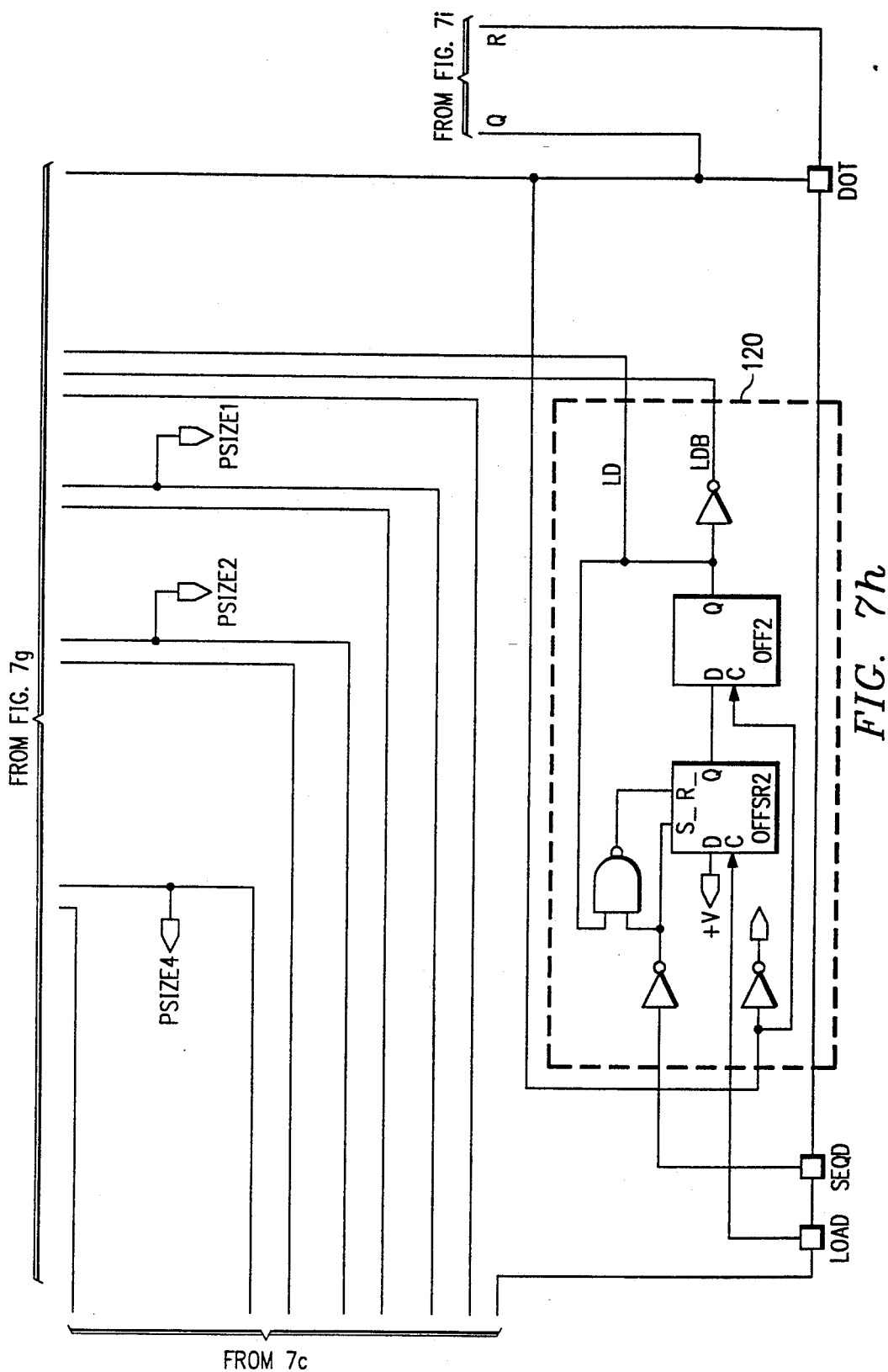

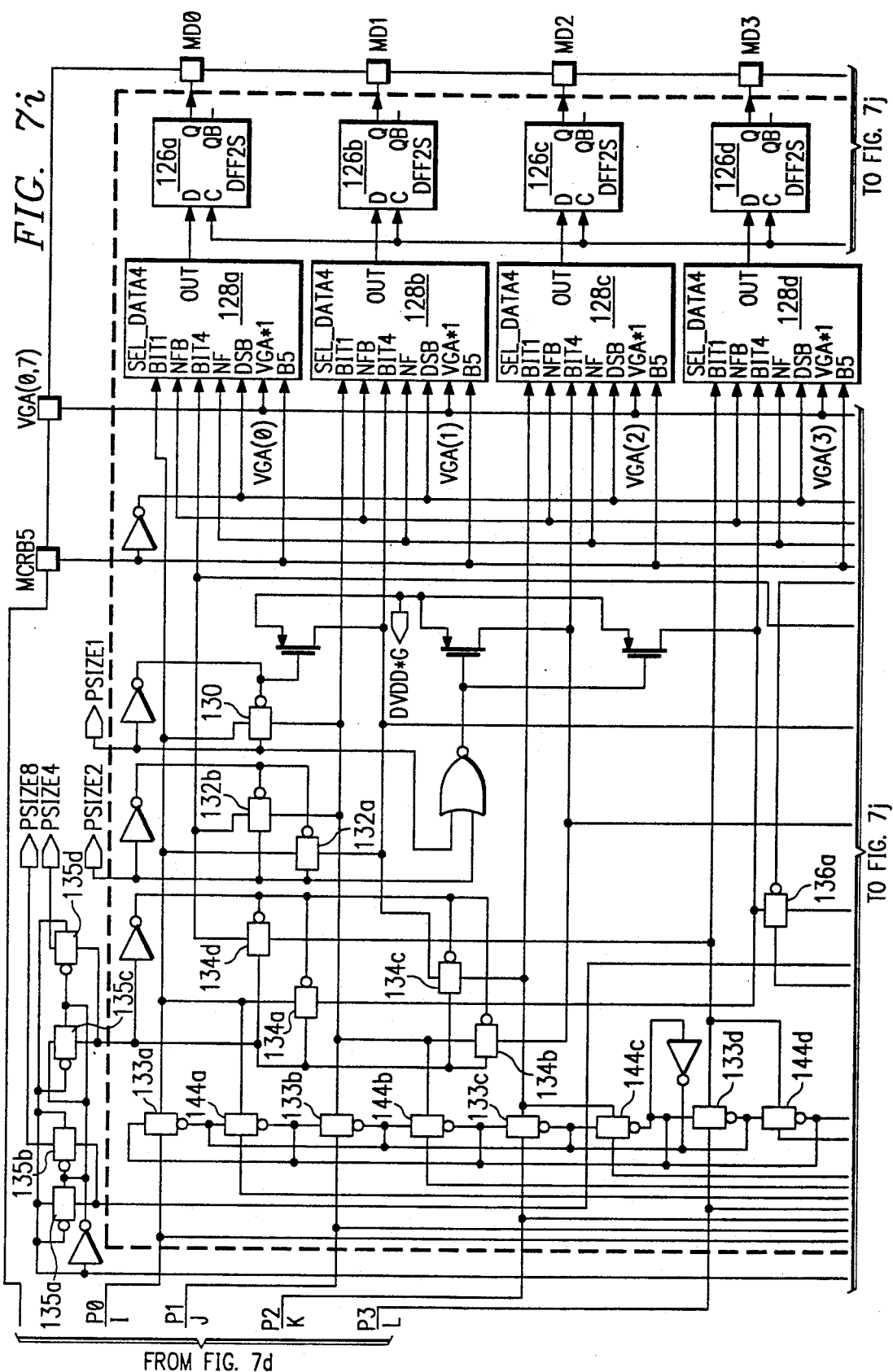

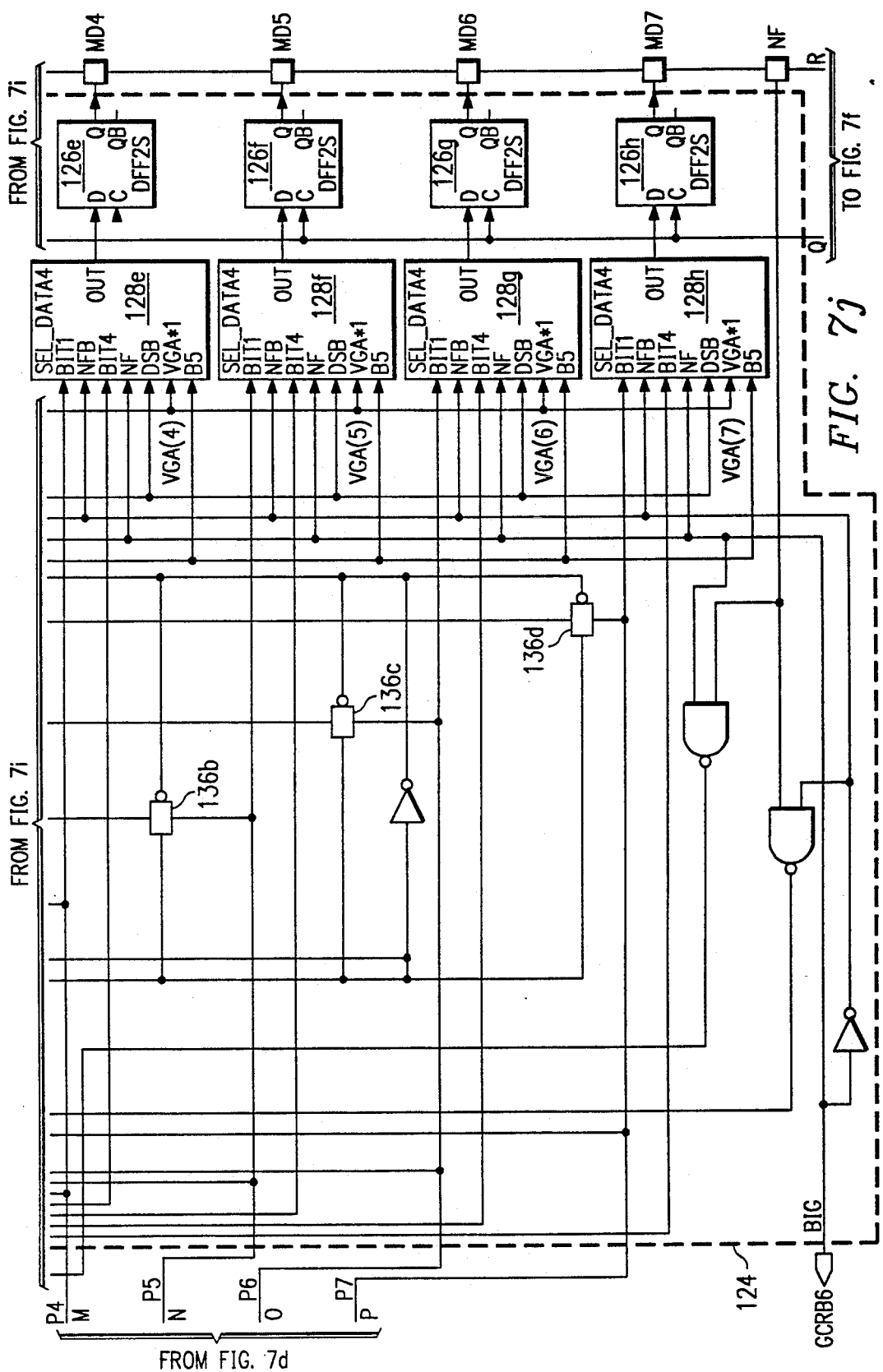

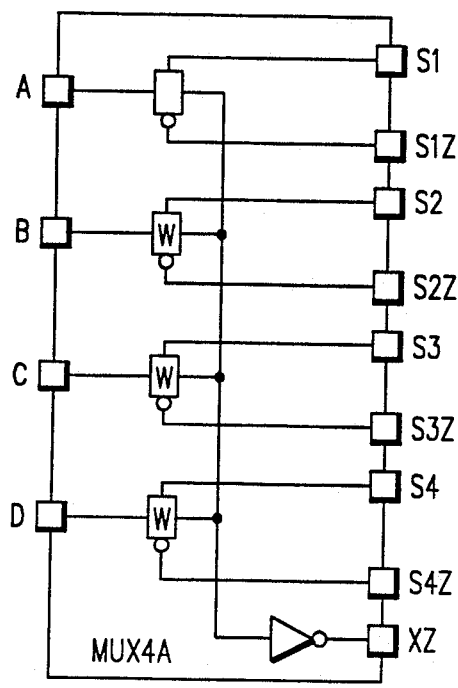
FIG. 8p
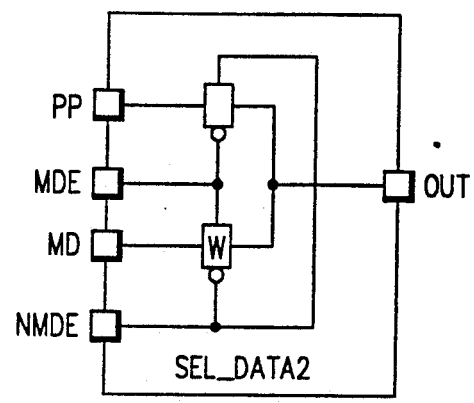
FIG. 8q
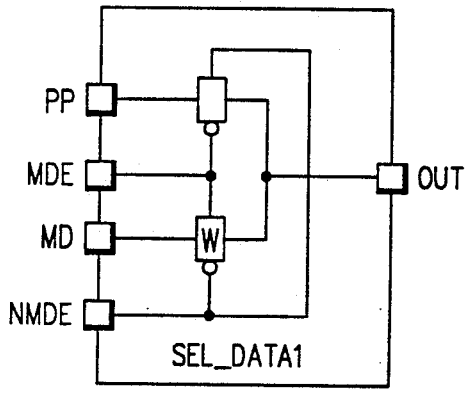
FIG. 8r
FIG. 8s
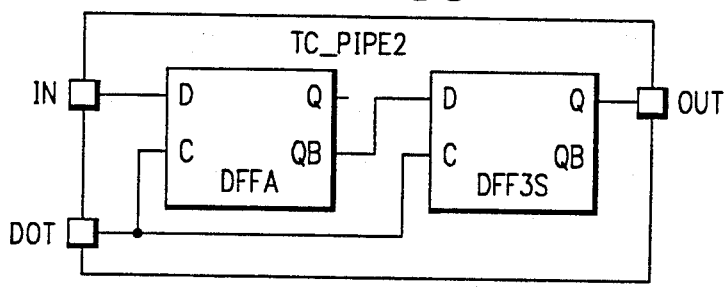
FIG. 8t
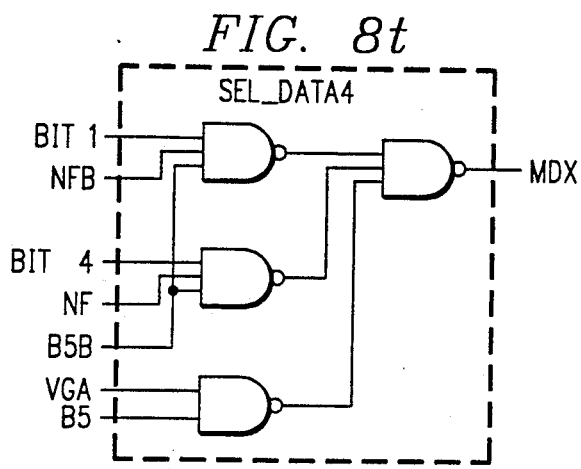
FIG. 8u
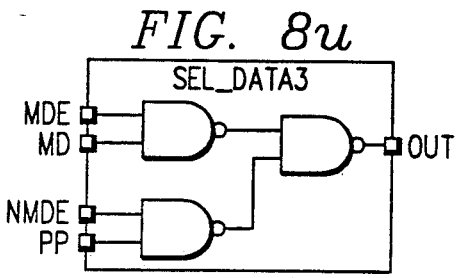

COLOR PALETTE DEVICE HAVING BIG/LITTLE ENDIAN INTERFACING, SYSTEMS AND METHODS

NOTICE (C) Copyright, *M* Texas Instruments Incorporated, 1990. A portion of the Disclosure of this patent document contains material which is subject to copyright protection. The copyright owner has no objection to facsimile reproduction by anyone of the patent document or the patent disclosure, as it appears in the U.S. Patent and Trademark Office, patent file or records, but otherwise reserves all rights in its copyright whatsoever.

CROSS-REFERENCE TO RELATED APPLICATIONS

U.S. patent application Ser. No. 07/544,775, entitled "PACKED BUS SELECTION OF MULTIPLE PIXEL DEPTHS IN PALETTE DEVICES, SYSTEM AND METHODS";

U.S. patent application Ser. No. 07/734,344, entitled "TEST CIRCUITRY, SYSTEMS AND METHODS";

U.S. patent application Ser. No. 07/720,100, entitled "SEQUENTIAL ACCESS MEMORIES, SYSTEMS AND METHODS";

U.S. patent application Ser. No. 07/723,342, entitled "AN IMPROVED FRAME BUFFER, SYSTEMS AND METHODS";

U.S. patent application Ser. No. 07/544,779, entitled "COMPUTER GRAPHICS SYSTEMS, PALETTE DEVICES AND METHODS FOR SHIFT CLOCK PULSE INSERTION DURING BLANKING";

U.S. patent application Ser. No. 07/545,422, entitled "PALETTE DEVICES, COMPUTER GRAPHICS SYSTEMS AND METHODS WITH PARALLEL LOOK-UP AND INPUT SIGNAL SPLITTING";

U.S. patent application Ser. No. 07/544,774, entitled "PALETTE DEVICES, SYSTEMS AND METHODS FOR TRUE COLOR MODE";

U.S. patent application Ser. No. 07/545,421, entitled "DEVICES, SYSTEMS AND METHODS FOR PALETTE PASS THROUGH MODE";

U.S. patent application Ser. No. 07/544,771, entitled "INTEGRATED CIRCUIT INTERNAL TEST CIRCUITS AND METHODS"; and U.S. patent application Ser. No. 07/545,424, entitled "GRAPHICS SYSTEMS, PALETTES AND METHODS WITH COMBINED VIDEO AND SHIFT CLOCK CONTROL", all of the above are assigned to Texas Instruments Incorporated, the assignee of the present application, and are cross-referenced and incorporated into the present application by reference herein.

TECHNICAL FIELD OF THE INVENTION

The present invention relates in general to graphics processors and in particular to a flexible graphics interface device with selectable Big/Little Endian modes, systems and methods.

BACKGROUND OF THE INVENTION

Without limiting the general scope of the invention, its background is described in connection with computer graphics, as an example only.

In computer graphics systems, the low cost of dynamic random access memories (DRAM) has made it economical to provide a bit map or pixel map system memory. In such a bit map or pixel map memory, a color code is stored in a memory location corresponding to each pixel to be displayed. A video system is provided which recalls the color codes for each pixel and generates a raster scan video signal corresponding to the recalled color codes. Thus, the data stored in the memory determine the display by determining the color generated for each pixel (picture element) of the display.

The requirement for a natural looking display and the minimization of required memory are conflicting. In order to have a natural looking display, it is necessary to have a large number of available colors. This, in turn, necessitates a large number of bits for each pixel in order to specify the particular color desired from among a large number of possibilities. The provision of a large number of bits per pixel, however, requires a large amount of memory for storage. Since a number of bits must be provided for each pixel in the display, even a modest size display would therefore require a large memory. Thus, it is advantageous to provide some method to reduce the amount of memory needed to store the display while retaining the capability of choosing among a large number of colors.

The provision of a circuit called a color palette enables a compromise between these conflicting requirements. The color palette stores color data words which specify colors to be displayed in a form that is ready for digital-to-analog conversion directly from the color palette. Corresponding color codes having a limited number of bits are stored in the memory for each pixel have a limited number of bits, thereby reducing the memory requirements. The color codes are employed to select one of a number of color registers or palette locations. Thus, the color codes do not themselves define colors, but instead, identify preselected palette locations. These color registers or palette locations each store color data words which are longer than the color codes in the pixel map memory. The number of such color registers or palette locations provided in the color palette is equal to the number of selections provided by the color codes. For example, a 4-bit color code can be used to select sixteen palette locations. Significantly, the color data words can be redefined in the palette from frame to frame to provide many more colors in an ongoing sequence of frames than are present in any one frame. Significantly, the ability to redefine the color data words in the palette allow for the customization of colors on the display from one application to another.

Graphics processing systems may operate in either the Big Endian or Little Endian data formats. The Big Endian and Little Endian formats determine how data are interpreted as a function of the ordering of the words or bits making up a selected data structure. For example, the graphics processor may output a 32-bit word representing either one 32-bit, two 16-bit, four 8-bit, eight 4-bit, sixteen 2-bit or thirty-two 1-bit color code words (each color code word representing one pixel) to the color palette. Each color code word is normally assigned a designator, and for multiple bit color code words, each bit in a word is assigned a designator. Thus, if a 32-bit word from the frame buffer represents four 8-bit color code words to the palette, the 8-bit words may be designated B0-B3 and the corresponding eight bits in each word designated D0-D7. In the Little Endian format, the bit or word with the lowest designator represents the least significant bit or word in the data structure. In this example, bit D0 would represent the least significant bit in each 8-bit word and word B0 would represent the least significant color code word in the 32-bit word output from the frame buffer. In the Big Endian format, the bit or word with the lowest designator represents the most significant bit or word in the data structure. In this example, bit D0 would represent the most significant bit in each 8-bit word and word B0 would represent the most significant color code word in the 32-bit word received from the frame buffer.

Since the bit and word ordering of the Big and Little Endian formats are essentially mirror images of each other, it is critical that both the graphics processor and the color palette operate in the same format when multiple bit words of pixel data are being output from the system frame buffer to the color palette. Specifically, the mapping of bits from memory to the display screen is performed in terms of the ordering of color code words received from the frame buffer. Further, in the normal operating mode the ordering of the bits in each color code word is critical to providing the proper address to the color palette look-up table. A color palette not operating in the same format as the processor will misinterpret the data from the frame buffer resulting in improper mapping to the display screen and/or improper addressing to the palette look-up table. It should be noted that these Big/Little Endian mode compatibility problems will normally not arise when pixel data is being transferred in only one pixel size (i.e. only in a preselected one of 1, 2, 4, 8, 16 or 32-bits for example). In this situation, the system and the associated palette can be appropriately wired to obtain compatibility, an approach which will not necessarily work when two or more pixel sizes are being supported by the same system.

In currently available color palettes that support more than one pixel size, only one format, Big or Little Endian is typically selected for a particular palette design which limits the possible uses of that particular color palette to those compatible systems using the same format. Thus, two different color palette designs are now normally required to provide color palettes operable in systems using the two different formats. Simply put, the ability to insert a currently available color palette into any system, no matter which format, Big or Little Endian, is lacking.

Due to the advantages of color palette devices, systems and methods, any improvement in their implementation is advantageous in computer graphics technology. Specifically, color palette devices, systems and methods operable in both those systems using the Little Endian format and those systems using the Big Endian would be particularly advantageous. Of particular advantage is the ability to build, test and sell a single color palette device operable in systems using either the Big Endian or Little Endian format in place of two separate color palettes, one for use in Big Endian systems and one for use in Little Endian systems.

SUMMARY OF THE INVENTION

According to the invention, a color palette is provided which as a plurality of ordered input terminals while receiving a plurality of bits of data having an order. A true color path is included comprising first circuitry coupled to the input terminals for selectively reversing the order of the plurality of bits of data. Second circuitry is coupled to the first circuitry and is operable in a first mode to pass all of the plurality of bits received from the first circuitry and in a second mode pass at least one word comprising selected ones of the plurality of bits, the selected ones of the bits having a bit order. Third circuitry is coupled to the second circuitry and is operable to pass all of the bits of data received from the second circuitry in the first mode and operable to selectively reverse the ordering of the selected ones of the bits and pass the at least one word received from the second word in the second mode. Fourth circuitry is additionally provided coupled to the third circuitry and operable to receive bits of data passed from the third circuitry and select for output as at least one word of true color data at least some of the bits.

The illustrated embodiments of the present invention provide the significant technical advantage of providing for the compatibility between graphics processing circuitry operating in the Big Endian format and graphics processing circuitry operating in the Little Endian data format. It is particularly advantageous to provide a single design, for color palette devices such that a selected color palette device may be operable in both those systems using the Little Endian format and those systems using the Big Endian format.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a functional block diagram of a graphics processor system utilizing one embodiment of the present invention;

FIG. 2 is a more detailed functional block diagram of a graphics processor for use with the invention;

FIG. 3 is a schematic diagram depicting a preferred architecture for video RAM depicted in FIG. 1;

FIGS. 7a–7j are complete functional level electrical schematics of the selector 78 of FIG. 4;

DETAILED DESCRIPTION OF THE INVENTION

Figure 4:
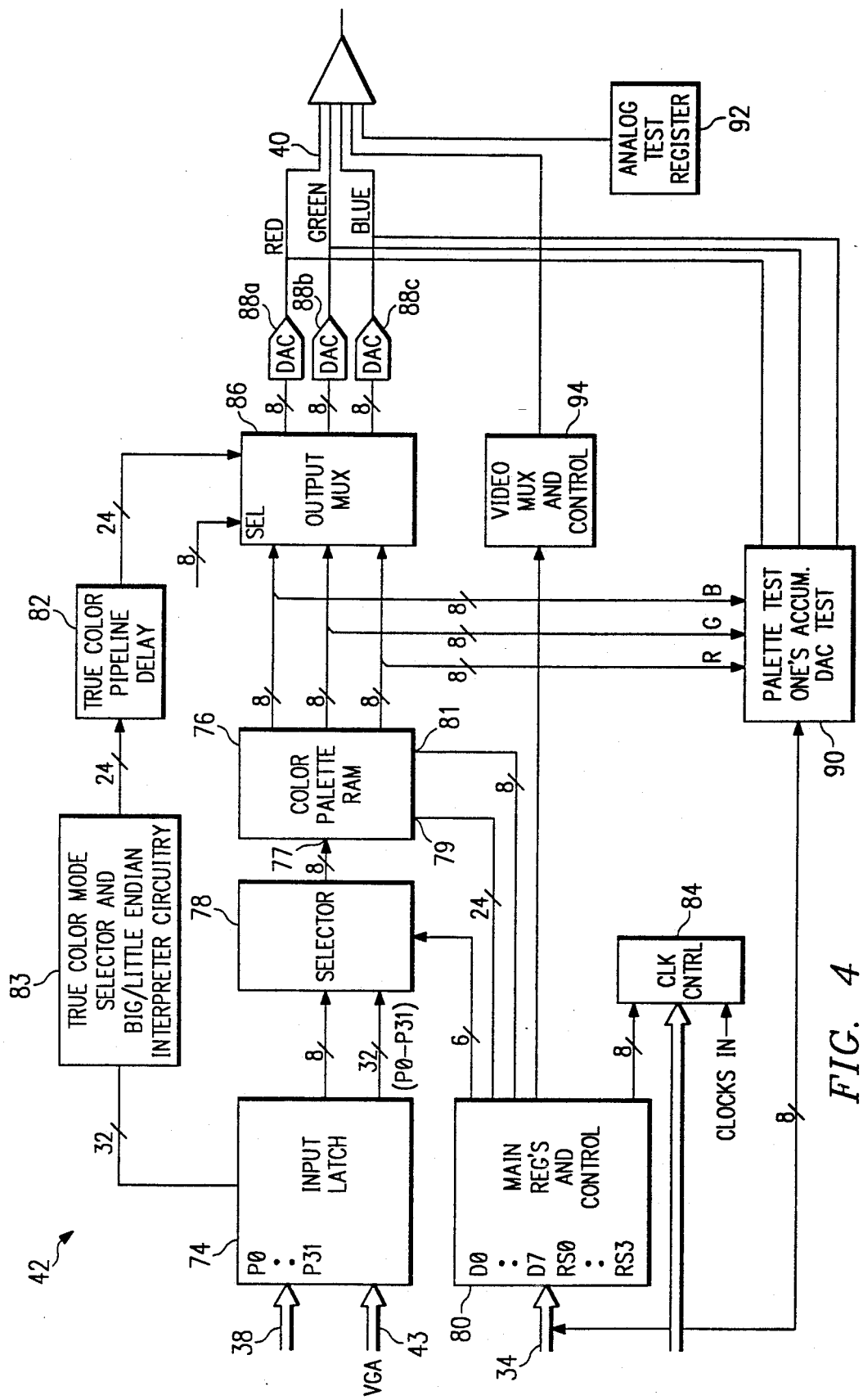
FIG. 4 is a functional block diagram of a video palette depicted in FIG. 1.

The preferred embodiment of the present invention and its advantages are best understood by referring to FIGS. 1–8u of the drawings, like numerals being used for like and corresponding parts of the various drawings.

Referring first to FIG. 1, a block diagram of a graphics computer system 10 is depicted as constructed in accordance with the principles of the illustrated embodiment of the present invention. For clarity and brevity in understanding the inventive concepts herein, a detailed description of the complete graphics processing system will not be provided. A more complete detailed discussion, however, can be found in patent application Ser. No. 07/544,775 filed Jun. 24, 1990, assigned to the assignee of the present application and hereby incorporated by reference. Also incorporated by reference herein are Texas Instruments TMS 34010 User's Guide (Aug. 1988); TIGA-340 (TM) Interface, Texas Instruments Graphics Architecture, User's Guide, 1989; TMS 34020 User's Guide (Jan. 1990); TMS 44C251 Specification; TMS34010 Graphics System Processor Products Application Guide, Texas Instruments, 1988; Texas Instruments 340 Family Third Party Guide (Jun. 1990); and Texas Instruments Graphics Systems Primer, 1989, all of which documents are currently available to the general public from Texas Instruments Incorporated. These documents give a more thorough description of graphics processing systems in general.

Graphics computer system 10 includes a host processing system 12 coupled to a graphics printed wiring board 14 through a bidirectional bus 16. In alternate embodiments, the circuitry discussed below in relation to graphics board 14 may reside on the system motherboard. Located on printed wiring board 14 are a graphics processor 18, memory 20, a video palette 22 and a digital-to-video converter 24. Video display 26 is driven by graphics board 14.

Host processing system 12 provides the major computational capacity for graphics computer system 10 and determines the content of the visual display to be presented to the user on video display 26. The details of the construction of host processing system 12 are conventional in nature and known in the art and therefore will not be discussed in further detail herein.

Graphics processor 18 provides the data manipulation capability required to generate the particular video display presented to the user. Graphics processor 18 is bidirectionally coupled to processing system 12 via bus 16. While graphics processor 18 operates as a data processor independent of host processing system 12, graphics processor 18 is fully responsive to requests output from host processing 12. Graphics processor 18 further communicates with memory 20 via video memory bus 28. Graphics processor 12 controls the data stored within video RAM 30, RAM 30 forming a portion of memory 20. In addition, graphics processor 18 may be controlled by programs stored in either video RAM 30 or in read-only memory 32. Read-only memory 32 may also include various types of graphic image data, such as alpha-numeric characters in one or more font styles, and frequently used icons. Further, graphics processor 12 controls data stored within video palette 22 via bidirectional bus 34. Finally, graphics processor 18 controls digital-to-video converter 24 via video control bus 36.

Video RAM 30 contains bit map graphic data which control the video image presented to the user as manipulated by graphics processor 18. In addition, video data corresponding to the current display screen are output from video RAM 30 on bus 38 to video palette 22. Video RAM 30 may consist of a bank of several separate random access memory integrated circuits, the output of each circuit could vary from one to 32-bits wide, but typically 8-bit wide as VGA specifies.

Video palette 22 receives high speed video data from video random access memory 30 via bus 38 and data from graphics processor 18 via bus 34. In turn, video palette 22 converts the data received on bus 38 into a video level which is output on bus 40. This conversion is achieved by means of a look-up table which is specified by graphics processor 18 via video memory bus 34. The output of video palette 22 may comprise color, hue and saturation signals for each picture element or may comprise red, green and blue primary color levels for each pixel. Digital-to-video converter 24 converts the digital output of video palette 22 into the necessary analog levels for application to video display 26 via bus 40.

Printed wiring board 14 also includes a VGA pass-through port 43 coupled to palette 42. In the VGA pass-through mode, data from the VGA connector of a typical VGA-compatible personal computer is fed directly into palette 42 without the need for external data multiplexing. This allows a replacement graphics board to remain "downward compatible" by utilizing the existing graphic circuitry often located on the mother board of the associated host processing system 12.

Video palette 22 and digital-to-video converter 24 may be integrated together to form a "programmable palette" 42 or simply "palette" 42. The palette RAM, discussed below, is often referred to as the "look-up" table.

Video display 26 receives the video output from digital-to-video converter 24 and generates the specified video image for viewing by the user of graphics computer system 10. Significantly, video palette 22, digital-to-video converter 24 and video display 26 may operate in accordance with either of two major video techniques. In the first technique, video data are specified in terms of hue, saturation and lightness for each individual pixel. In the second technique, the individual primary color levels of red, blue and green are specified for each individual pixel. Upon selection of the desired design using either of these two techniques, video palette 22, digital-to-video converter 24 and video display 26 are customized to implement the selected technique. However, the principles of the present invention in regard to the operation of the graphics processor 18 are unchanged regardless of the particular design choice of the video technique. All of the signals that contribute to display color in some way are regarded as color signals even though they may not be of the red, blue, green technique.

FIG. 2 generally illustrates graphics processor 18 in further detail. Graphics processor 18 includes central processing unit 44, graphics hardware 46, register files 48, instruction cache 50, host interface 52, memory interface 54, input/output registers 56 and video display controller 58.

The central processing unit 44 performs a number of general purpose data processing functions including arithmetic and logic operations normally included in a general purpose central processing unit. In addition, central processing unit 44 controls a number of special purpose graphics instructions, either alone or in conjunction with graphics hardware 46.

Graphics processor 18 includes a major bus 60 which is connected to most parts of graphics processor 18, including central processing unit 44. Central processing unit 44 is bidirectionally coupled to a set of register files 48, including a number of data registers, via bidirectional register bus 62. Register files 48 serve as the repository of the immediately accessible data used by central processing unit 44.

Central processing unit 44 is also connected to instruction cache 50 by instruction cache bus 64. Instruction cache 50 is further coupled to bus 60 and may be loaded with instruction words from video memory 20 (FIG. 1) via video memory bus 28 and memory interface 54. The purpose of instruction cache 50 is to speed up the execution of certain functions of central processing unit 44. For example, a repetitive function that is often used within a particular portion of the program executed by central processing unit 44 may be stored within instruction cache 50. Access to instruction cache 50 via instruction cache bus 64 is much faster than access to video memory 20 and thus, the overall program executed by central processing unit 44 may be sped up by a preliminary loading of the repeated or often used sequences of instructions within instruction cache 50.

Host interface 52 is coupled to central processing unit 44 via host interface bus 66. Host interface 52 is further connected to host processing system 12 via host system bus 16. Host interface 52 serve to control the communications between host processing system 16 and graphics processor 18. Typically, host interface 52 communicates graphics requests from the host processing system 16 to graphics processor 18, enabling host system 16 to specify the type of display to be generated by video display 26 and causing graphics processor 18 to perform a desired graphic function.

Central processing unit 44 is further coupled to graphics hardware 46 via graphics hardware bus 68. Graphics hardware 46 is additionally connected to major bus 60. Graphics hardware 46 operates in conjunction with central processing unit 44 to perform graphic processing operations. In particular, graphics hardware 46 under control of central processing 44 is operable to manipulate data within the bit map portion of video RAM 30.

Memory interface 54 is coupled to bus 60 and further coupled to video memory bus 28. Memory interface 54 serves to control the communication of data and instructions between graphics processor 18 and memory 20. Memory 20 includes both the bit map data to be displayed on video display 26 and the instructions and data necessary for the control and operation of graphics processor 18. These functions include control of the timing of memory access, and control of data and memory multiplexing.

Graphics processor 18 also includes input/output registers 56 and a video display controller 58. Input/output registers 56 are bidirectionally coupled to bus 60 to enable reading and writing within these 15 registers. Input/output registers 56 are preferably within the ordinary memory space of central processing unit 44. Input/output registers 56 contain data which specify the control parameters of video display controller 58. In accordance with the data stored within the input/output registers 56, video display controller 58 controls the signals on video control bus 36 for the desired control of palette 42. For example, data within input/output registers 56 may include data for specifying the number of pixels per horizontal line, the horizontal synchronization and blanking intervals, the number of horizontal lines per frame and the vertical synchronization and blanking intervals.

Referring next to FIG. 3, a typical graphics memory system configuration for video RAM 20 is depicted in which eight VRAM memories 68 are used as an array, two of which are depicted as 68a and 68b. Each VRAM memory 68, or unit, includes four sections, or planes, 0, 1, 2 and 3. The construction of each plane is such that a single data lead 70 is used to write information to that plane. In a system which uses a 32-bit data bus, such as data bus 28, there would be eight VRAM memories, each VRAM memory having four data leads connected to the input data bus. For example, for 32-bit data bus 28, VRAM memory 68a would have its four data leads 70 connected to data bus 28 leads 0, 1, 2, and 3, respectively. Likewise, the next VRAM memory 68b would have its four leads 0, 1, 2, and 3 connected to data bus 28 leads 4, 5, 6, and 7, respectively. This pattern continues for the remaining six VRAMS such that the last VRAM has its leads connected to leads 28, 29, 30, 31 (not shown) of bus 28.

The VRAM memories 68 are arranged such that the pixel information for the graphics display is stored serially across the planes in the same row. Assuming a 4-bit per pixel system, then the bits for each pixel are stored in separate VRAM memory. In such a situation, pixel 0 would be the first VRAM 68a and pixel i would be the second VRAM 68b. The pixel storage for pixels 2-7 are not shown, but these would be stored in column 1 of VRAMS 68c, d, e, f, g and h. The pixel information for pixel 8 would be stored in the first VRAM 68a, still in row A, but in column 2 thereof.

Each VRAM plane has a serial register 72 for shifting out information from a row of memory. In the preferred embodiment, the shifting out is performed in response to a shift clock signal SCLK (not shown) generated on palette 42 (FIG. 1). The outputs from these registers are connected to bus 38 in the same manner as the data input leads are connected to input bus 28. Thus, data from a row memory, such as row A, would be moved into register 72 and output serially from each register 72 and in parallel on bus 38. This would occur for each plane of the eight VRAM memory array.

The memory configuration depicted in FIG. 3 is not limited to the handling of 4-bit pixel description data. For example, if the information for each pixel was to be described in eight bits, then two VRAMs 68 would be required to store per pixel. Further, for increased ability in handling data, shift registers 72 would be split in half with each half used to output data onto bus 38. The split register approach allows for differences in the number of pixels required by the display and the number of bits per pixel desired. A more complete description of this feature can be found in co-assigned application Ser. No. 544,775 and hence, will not be repeated here.

Returning to FIGS. 1 and 2, graphics processor 18 operates in two different address modes to address memory 20. These two address modes are X-Y addressing and linear addressing. In linear addressing, a pixel is designated by its starting address in memory. The pixel size is determined by the data within a register within central processing unit 44. In X-Y addressing, a pixel is designated by its X and Y coordinate values on the display.

It is important to note that in any event, graphics processor 18 may manipulate data to provide for a variable number of pixels as required by the associate display 26 as well as a variable number of data bits per pixel in each color code. This provides increased flexibility in terms of the size and resolution of display 26 and the number of possible colors available for a given pixel. As will be discussed below in further detail in conjunction with the description of the color palette 42, graphics processor 18 in the illustrated embodiment outputs 32-bit color code words, each of which may be interpreted by the palette as thirty-two 1-bit, sixteen 2-bit, eight 4-bit, or four 8-bit pixels. In the normal or "pseudo-color" mode, each n-bit pixel in turn selects one of $2^n$ entries in the look-up table. For the case of n less than eight, a page register (not shown) within the palette device supplies the remaining 8-n bits of the 8-bit address necessary to uniquely designate a particular one of the 256 entries in the look-up table.

Figure 5:
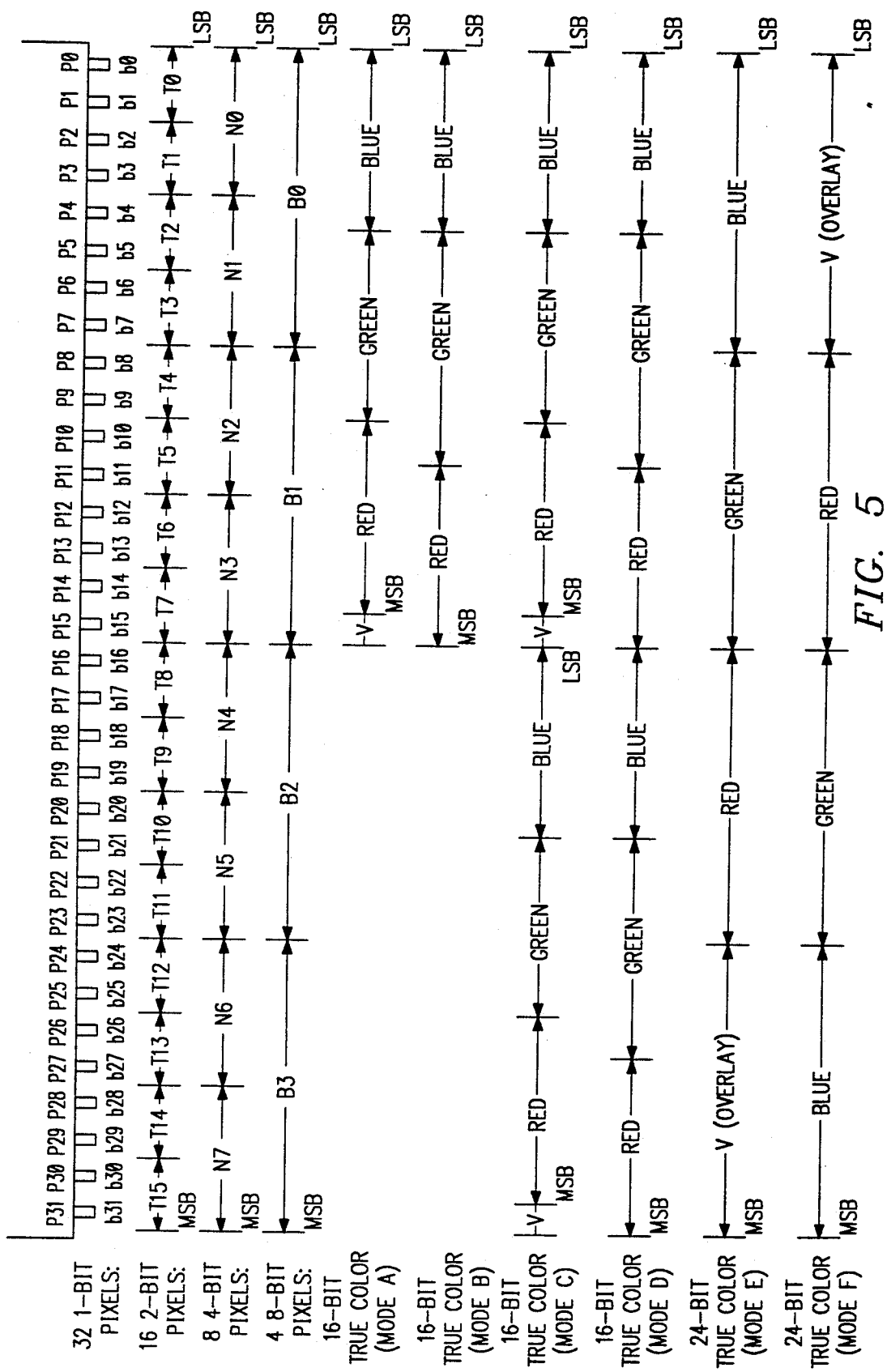
FIG. 5 is a diagram showing the mapping of data from the video RAM 30 of FIG. 1 to the inputs of the color palette 42 of FIG. 4 as interfaced in the Little Endian format.
Figure 6:
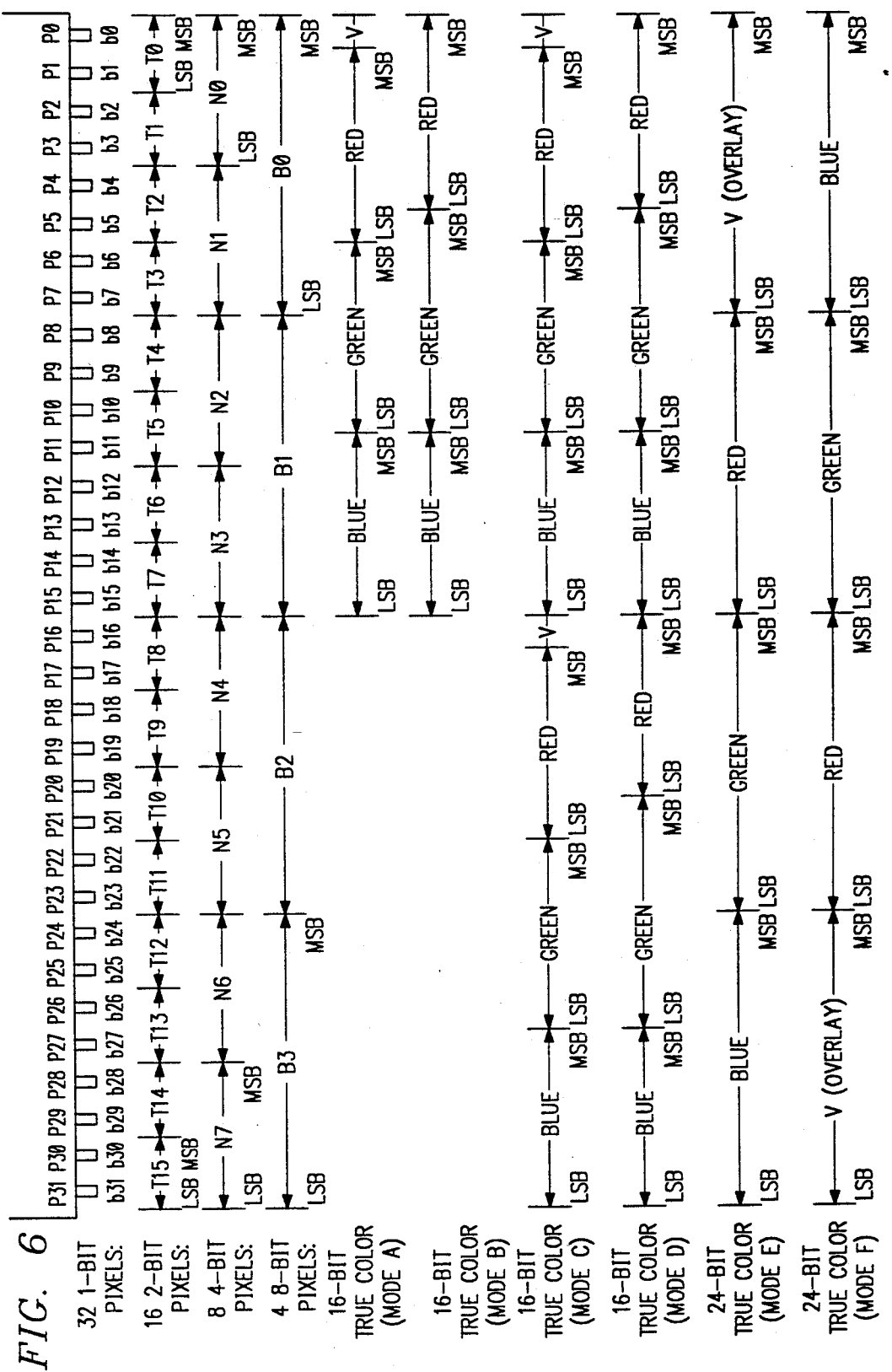
FIG. 6 is a diagram showing the mapping of data from the video RAM 30 of FIG. 1 to the inputs of the color palette 42 of FIG. 4 as interfaced in the Big Endian format.
Figure 7A:
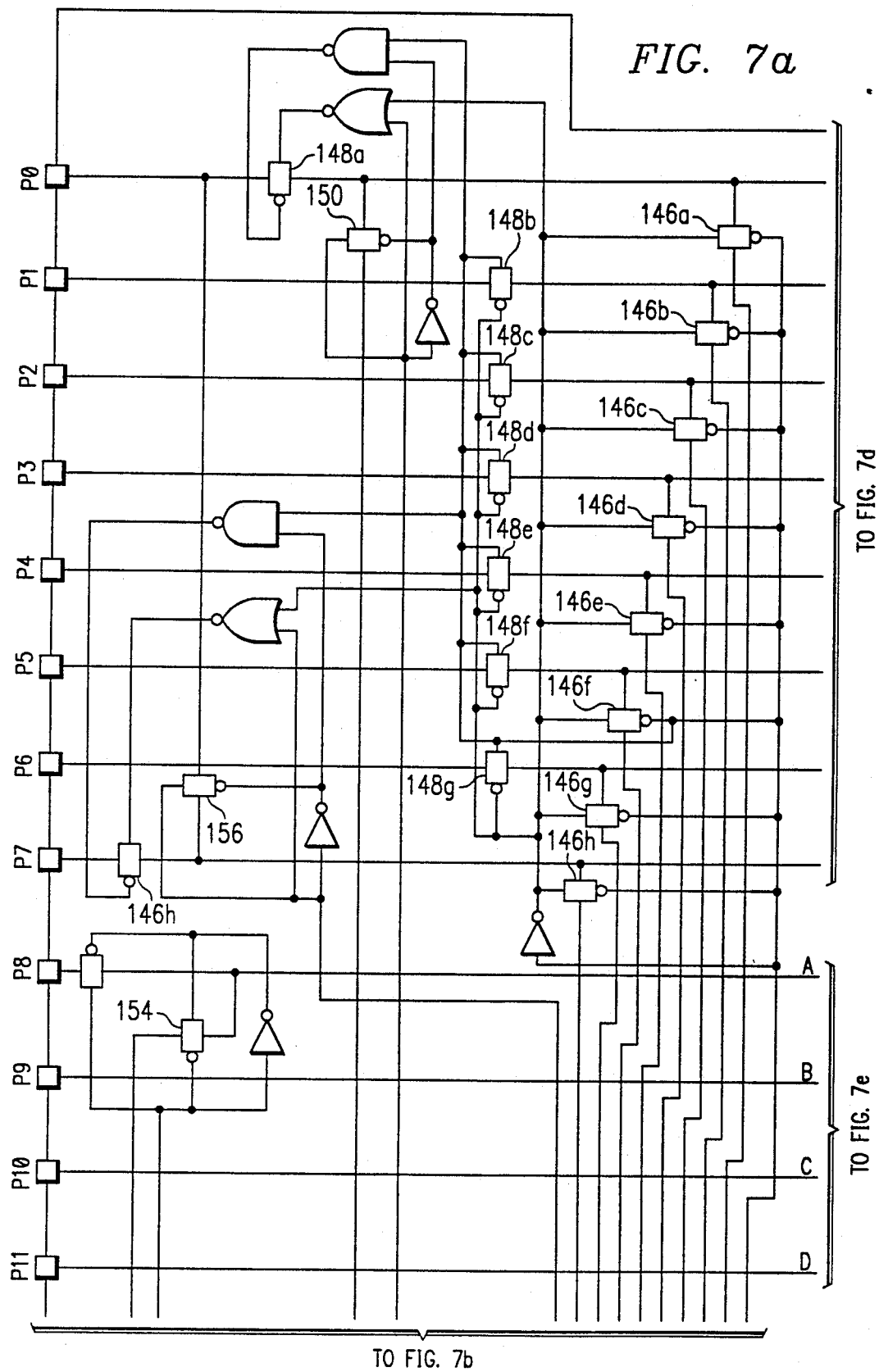
Figure 7B:
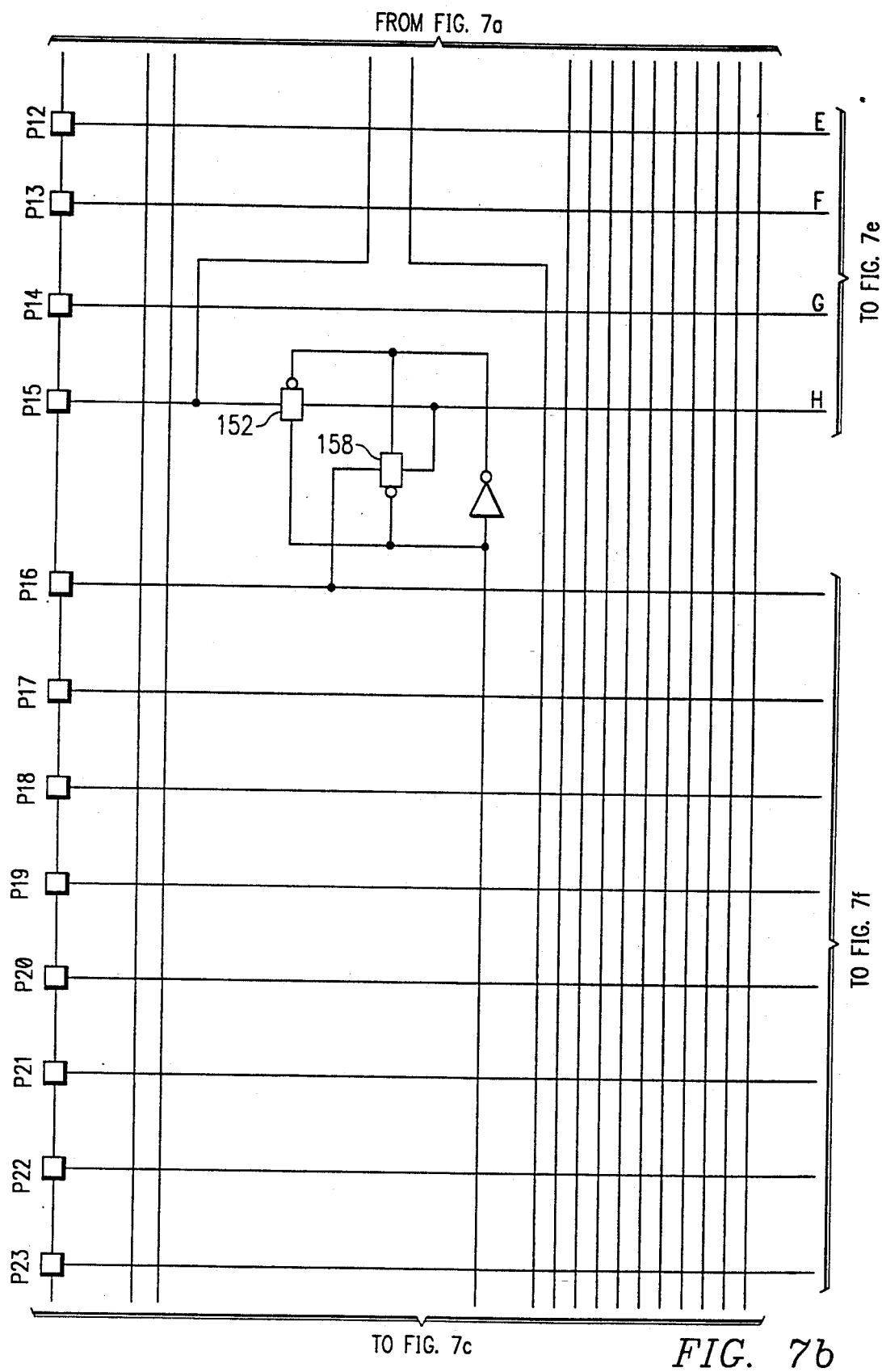
Figure 7C:
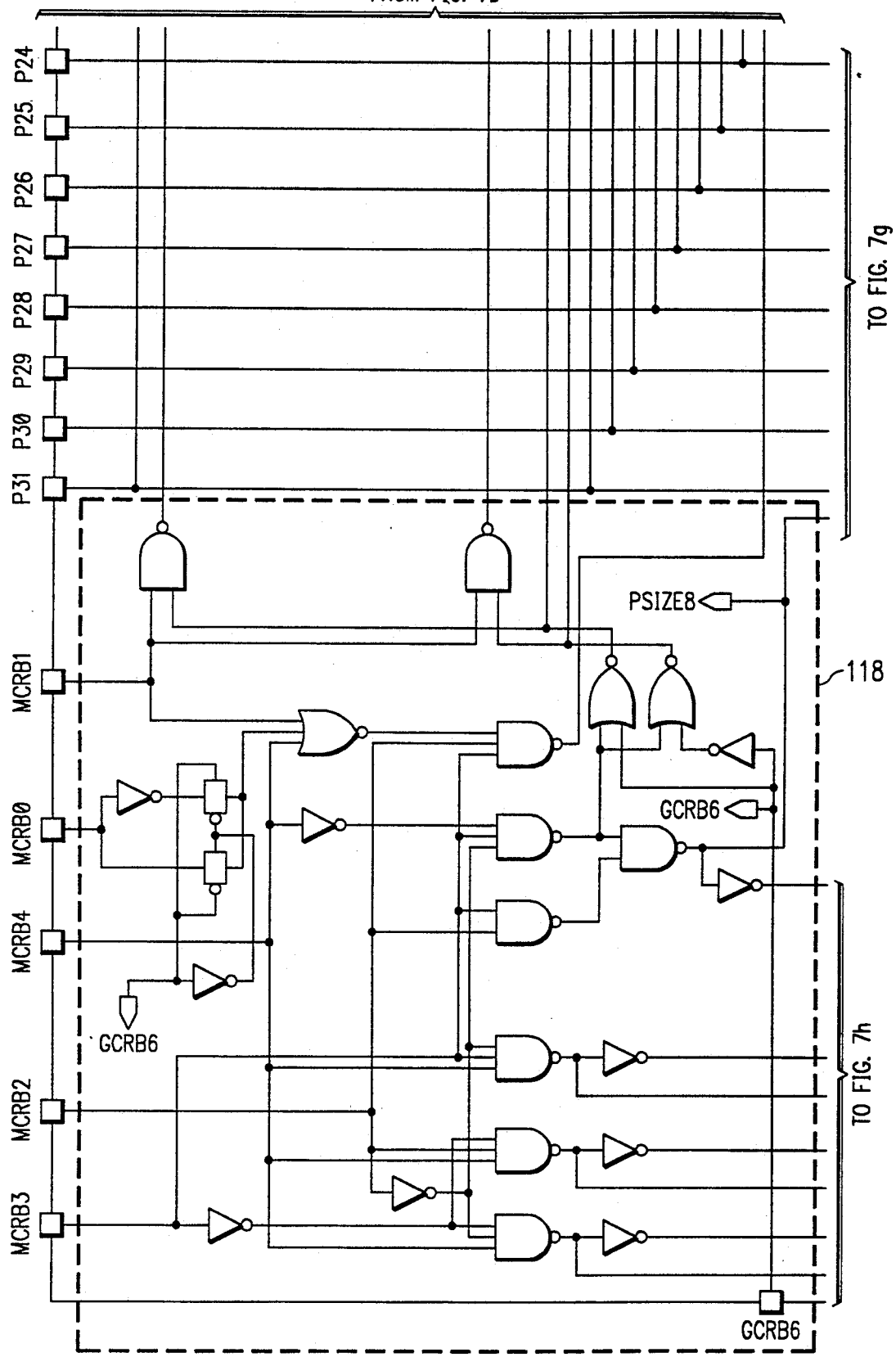
Figure 7G:
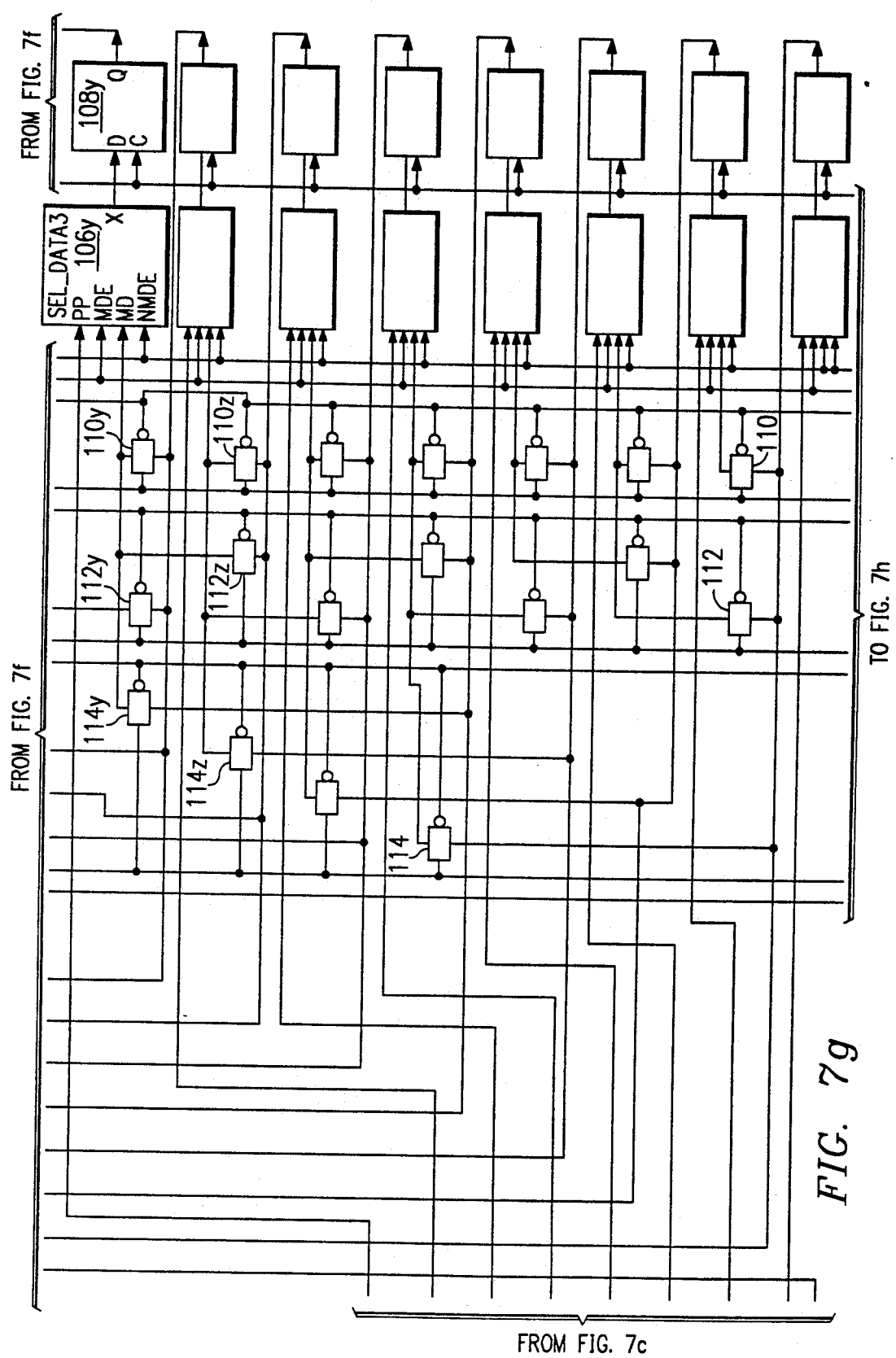

FIG. 4 is a more detailed depiction of palette 42 emphasizing the color palette RAM and the circuitry controlling it. Palette 42 includes an input latch 74 coupled to video memory 20 (FIG. 1) via bus 38 and input pins P0-P31. Color palette 42 can process data received at pins P0-P31 in either the Big Endian or Little Endian data formats. In the illustrated embodiment, the normal operating configuration of palette 42 is Little Endian, with data mapped to directly to pins P0-P31 as shown in FIG. 5 for the various operating modes, discussed further below. In the Big Endian mode, the wiring to pins P0-P31 is reversed by the user, such that the data mapping to input pins P0-P31 is as shown in FIG. 6. Following reverse wiring by the user in the Big Endian mode, the word ordering of the pixel data received at pins P0-P31 and used in the "normal mode" through the pseudo-color path discussed below is compatible with the Little Endian operating mode of palette 42, however, the bit ordering within each word of two bits or more is now backwards. In the true color modes in Big Endian, following reverse wiring the word ordering and the bit ordering of the true color data are reversed. The reverse wiring has thus made compatibility in the normal (pseudo-color) mode easier to achieve —only the bit ordering need be reversed rather than both the word and bit ordering of the incoming data. As discussed below, both bit ordering and word ordering will be accounted for by color palette 42 itself when operating on Big Endian data.

In the illustrated embodiment, input latch 74 receives color codes output from eight VRAM memories 68 comprising video RAM memory 30. Color palette RAM 76, maintaining the look-up table, which in the pseudo-color modes provides color data words in response to color codes received at input latch 74. In the illustrated embodiment, selector 78 couples color palette RAM 76 and input latch 74, and in the pseudo-color mode outputs either thirty-two 1-bit, sixteen 2-bit, eight 4-bit or four 8-bit recall addresses for each 32-bit color code word received at latch 74 (i.e. a pixel bus width of thirty-two bits), depending on the mode selected. Each recall address then accesses the selected one of $2^n$ (where n equals the number of bits in the address) locations in RAM 76, each location holding a 24-bit color data word (eight bits each of red, green and blue color data). It is important to note that color palette 42 (FIG. 1) is also operable to receive color code words of four, eight and sixteen bits each. In these cases, selector 78 operates in the same manner to produce an appropriate number of recall addresses of a selected number of bits. For example, if 8-bit color code words are being received at input latches 74 (i.e., the pixel bus width being 8-bits) selector 78 may be configured to output either one 8-bit recall address, two 4-bit addresses, four 2-bit addresses or eight 1-bit addresses.

In the depicted example, Color Palette RAM 76 is of a 256×24-bit architecture with each address outputting a 24-bit word. Color palette RAM 76 preferably is a high-speed dual-port static RAM (SRAM); however, color palette RAM 76 may also be implemented using dynamic random access memories (DRAMS) or a Single-Ported SRAM.

Graphics processor 18 (FIG. 2) controls the contents of the color data words output to video display 26 in response to color codes received at latch 74 by the writing and reading of color data words to and from color palette RAM 76 using registers and control circuitry 80 and bus 34. Preferably, the ports 79 and 81 of a dual-port RAM are used for this data revision/update function. When a 256×24-bit memory is used, red, green and blue data are written in as a concatenated 24-bit word to port 79 word with an 8-bit address provided to port 81 determining the memory location. For a more detailed description of register control circuitry 80 and the preferred methods of reading and writing color data words into color palette RAM 76, refer to co-assigned application Ser. No. 07/720,100 Palette 42 also includes clock control circuitry 84, output multiplexer 86 and digital-to-analog converters 88. Also depicted in FIG. 4 are palette test and accumulator registers 90, analog test registers 92, and video multiplexer and control circuitry 94. For a more complete description of these components, reference is made to pending applications Ser. Nos. 07/544,775, 07/720,100, 07/723,342 and 07/734,344 incorporated herein by reference. True color pipeline delay 82 and Big/Little Endian interpreter circuitry 83 will be discussed more specifically below.

In addition to the pseudo-color mode, the illustrated embodiment of color palette 42 is further operable in 16 and 24-bit true color modes. In the true color modes, some of the thirty-two bits of data received at latch 74 are passed directly to the digital to analog converters 88 through output multiplexer 86. Further, a number of the remaining bits of each word received at latch 74 may be used as "overlay" data which addresses RAM 76 as in the normal pseudo-color mode. The data structures for the true color modes are depicted in FIGS. 5 and 6 as mapped to pins P0-P31 for the Little and Big Endian formats respectively. In the "A" True Color Mode, sixteen bits of data are received at pins P0-P15, fifteen bits (five each of red, blue and green data) are used as true color data and passed directly to output multiplexer 86, the remaining one bit is used as overlay data for addressing RAM 76 through selector 78. In the "B" True Color Mode all sixteen bits received at pins P0-P15 are passed directly to output multiplexer 86 as true color, five bits each of red and blue, and six bits of green (there is no overlay in Mode B). In both the A and B Modes, any data received at pins P16-P31 are "don't care". The "C" and "D" modes are similar to the A and B Modes respectively, only in these cases all thirty-two bits received at pins P0-P31 are used as two 16-bit words of true color and/or overlay data. As discussed below, the two 16-bit words are used sequentially to provide data to digital to analog converters 88.

Color palette 42 also is operable in two 24-bit true color modes (the "E" and "F" Modes). In each of these modes, the thirty-two bits received at the inputs represent eight bits each of red, green and blue true color data to be passed directly to digital to analog converters 88 and eight bits of overlay data to be passed through the pseudo-color path. The difference between the E and F Modes, notwithstanding Big and Little Endian formatting, is the word ordering.

The selection between the true color data or color data words output from RAM 76 is done in response to the overlay data passed through the pseudo-color path, when overlay data is provided as part of the data structure, using output multiplexer 86. True color pipeline delay 82 provides for the proper synchronization of the of true color data directly fed to output multiplexer 86, and color data words from RAM 76 in response to the overlay data. True color pipeline delay 82 performs this function by adding one latch delay, through clocked flip-flops, to the true color data for every pipeline delay seen by the overlay data and corresponding color data words through the pseudo-color path. The total pseudo-path delay from input latch 74 to the outputs of digital-to-analog converters 88 is nine DOT clock pipeline delays. Input latches 74 represent one clock delay, output multiplexer 86 represents another one clock delay and digital-to-analog converters 88 provide one clock delay, leaving six clock delays through color palette RAM 76, which must be replicated in the true color path as well. True color mode selector and Big Endian interpreter circuitry 83, as detailed further below, results in four clock delays through the true color path, and therefore, true color pipeline delay circuitry must add two clock delays in the illustrated embodiment to synchronize the true color data with the associated overlay data and the corresponding data from RAM 76.

In the illustrated embodiment, when the overlay data bits are a non-zero value, the twenty-four bits of red, blue, and green data output from the corresponding color palette RAM 76 location are passed to digital-to-analog converters 88. When the bits of overlay data are equal to 0, however, then the bits of red, green, and blue true color data bypassing color palette RAM 76 are provided to digital-to-analog converters 88 for output to display 26.

FIGS. 7a–7j are complete schematic diagrams of selector 78. In the preferred embodiment, selector 78 is configurable to receive color codes of 4-, 8-, 16- or 32-bits and to output a corresponding number of 1-, 2-, 4-, or 8-bit addresses, each addressing a location in RAM 76, in response. For addresses to RAM 76 which are less than eight bits, a page register (not shown) provides additional bits of address information for making the addressing word eight bits wide.

Selector 78 includes a bank of 2:1 multiplexers each having an A data input (MD) coupled to a respective input $P_x$. In the preferred embodiment, thirty-two multiplexers 106 are provided which transfer thirty-two bits of address data (color codes) which arrive at the inputs $P_0$–$P_{31}$ to a corresponding bank of thirty-two latches 108. The multiplexers pass data from the A inputs to the multiplexer outputs on the rising edge of signal LD and then hold the data until the next DOT clock arrives. The DOT Clock signal DOT latches the 32-bit word from multiplexers 106 into the bank of thirty-two latches 108 and, at the same time, toggles control signal LD, thereby switching the 2:1 multiplexers to select the B (MDE) data inputs.

The B inputs (MDE) of 2:1 multiplexers 106 are fed from an array of transmission gates configured in four groups comprising 8-, 4-, 2-, and 1-bit sections. In the illustrated embodiment, each word of color codes from video RAM 30 comprises a 32-bit word which may provide either thirty-two 1-bit, sixteen 2-bit, eight 4-bit or four 8-bit addresses to RAM 76, each address accessing a look-up table location for a given pixel. The array of transmissions gates provide for the variable number of address bits per pixel for a given color word from RAM 30. Transmission gates 110 comprise the 1-bit section, transmission gates 112 comprise the 2-bit section, transmission gates 114 comprise the 4-bit section and transmission gates 116 comprise the 8-bit section. The 1-bit section allows shifting and output of 1-bit addresses per each pixel, the 2-bit section shifting and output of 2-bit addresses per pixel, and so on. One set of transmission gates 110–116 is activated at any one time.

The inputs of transmission gates 110–116 are respectively coupled to the Q outputs of the 32-latch bank of latches 108. Each successive row of transmission gates is fed from the latches 108 of the rows below such that data can be shifted upward toward the least-significant bit MD0 (the "LSB"). Since a new 32-bit word in the preferred embodiment arrives and is switched through selector 78 with every LD, each DOT clock is used to shift groups of data upward through the active transmission gate group during the interval between each rising edge of LD (the "LD clock interval"). Thus, assuming thirty-two bits are being received at P0–P31 (i.e. the "pixel bus width=32"), if transmission gates 110 (the 1-bit group) are activated and LD is a divide by 32 of the DOT clock, thirty-two 1-bit words are shifted up and output by one bit at a time, if transmission gates 112 are activated (the 2-bit group) and LD is a divide by sixteen 2-bit addresses are shifted up and out two bits at a time, if transmission gates 114 are activated (the 4-bit group) and LD is a divide by 8 of the DOT clock eight 4-bit addresses are shifted up and out four bits at a time, and if transmission gates 116 (the 8-bit group) are activated and LD is a divide by 4 of the DOT clock four 8-bit addresses are shifted up and out eight bits at a time. Similar gate activation and clock intervals can be selected to shift out the corresponding addresses of selectable widths when 16-, 8-, or 4-bit pixels buses are coupled to the input pins.

Control circuitry 118, timing circuitry 120, and control and selector output circuitry 122 implement this functioning in accordance with multiplexer control register bits (MCRB) received from main registers and control circuitry 80. The multiplexer control register bits and DOT clock divide ratios (i.e., the number of DOT clocks provided between rising edges of signal LD) for varying pixel bus widths (i.e. the number of bits being received at the inputs to selector 78) and data bits per pixels (i.e. the number of bits in each address output from selector 78) are defined in TABLE 1:

TABLE 1

| MUX CONTROL REGISTER BITS | | | | | | DATA BITS PER PIXEL | PIXEL BUS WIDTH | LD DIVIDE RATIO |
|---|---|---|---|---|---|---|---|---|
| 5 | 4 | 3 | 2 | 1 | 0 | | | |
| 1 | 0 | 1 | 1 | 0 | 1 | 8 | 8 | 1 |
| 0 | 1 | 0 | 0 | 0 | 0 | 1 | 4 | 4 |
| 0 | 1 | 0 | 0 | 0 | 1 | 1 | 8 | 8 |
| 0 | 1 | 0 | 0 | 1 | 0 | 1 | 16 | 16 |
| 0 | 1 | 0 | 0 | 1 | 1 | 1 | 32 | 32 |
| 0 | 1 | 0 | 1 | 0 | 0 | 2 | 4 | 2 |
| 0 | 1 | 0 | 1 | 0 | 1 | 2 | 8 | 4 |
| 0 | 1 | 0 | 1 | 1 | 0 | 2 | 16 | 8 |
| 0 | 1 | 0 | 1 | 1 | 1 | 2 | 32 | 16 |
| 0 | 1 | 1 | 0 | 0 | 0 | 4 | 4 | 1 |
| 0 | 1 | 1 | 0 | 0 | 1 | 4 | 8 | 2 |
| 0 | 1 | 1 | 0 | 1 | 0 | 4 | 16 | 4 |
| 0 | 1 | 1 | 0 | 1 | 1 | 4 | 32 | 8 |
| 0 | 1 | 1 | 1 | 0 | 0 | 8 | 8 | 1 |
| 0 | 1 | 1 | 1 | 0 | 1 | 8 | 16 | 2 |
| 0 | 1 | 1 | 1 | 1 | 0 | 8 | 32 | 4 |
| 0 | 1 | 1 | 1 | 1 | 1 | 4 | 16 | 4 |

Selector output circuitry 124 (FIGS. 7i–7j) latches the output of selector 78, provides for reverse ordering of the bits in each word being output when palette 42 is operating in conjunction with a Big Endian processor, allows for the direct pass through to RAM 76 of VGA data and further provides for operation in the "special" nibble mode. In the Little Endian mode, when no reversing of the bit ordering of each address output from latches 108a–108h is required, the address data is passed directly to latches 126 through multiplexers 128. Latches 126 are clocked by the DOT clock such that the same DOT clock that initiates an upward data shift of the next address in the color code through latches 108 also latches and outputs the result of the previous shift through latches 126. Further, it is important to note that in the preferred operating mode, a continuous flow of data is received at input pins P0–P31. For high speed operation therefore, the first DOT clock after the signal LD not only latches the new data into latches 108, but it also latches and outputs through latches 126 the last address of the last color code word received at input pins P0–P31. The address to RAM 76 will always be an 8-bit address regardless of the number of bits of color data output from selector 70a/78 per pixel. A page register (not shown) is therefore used which makes up the missing most significant bits of any given address when the number of bits per address being output is less than eight.

In the Big Endian mode, the bits of each address word (of more than one bit) must be reversed to provide the correct addressing to RAM 76 (color palette 42 operating in default in the Little Endian mode). The bit reversal is accomplished in accordance with the number of bits per pixel in each address being output. In the Big Endian mode, the signal BIG is set high, thereby selecting the B (BIT4) input of multiplexers 128a–128h. When an address of one bit per pixel is being output, although no reversal is required, the signal PSIZE ONE is set high and transmission gate 130 is activated. The activation of transmission gate 130 simply transfers the one bit provided to the deselected A (BIT1) input of multiplexer 128a to the selected input BIT4 of the selector 128a. When an address of two bits per pixel is being output to RAM 76, signal PSIZE2 is set high activating transmission gates 132a and 132b. Transmission gates 132a and 132b reverse the ordering of the 2-bit word by coupling bit P0 to selected input BIT4 of 128b for output as bit MD1 while transmission gate 132b transfers bit P1 to the selected input BIT4 of multiplexer 128a for output by latch 126a as bit MD0. A similar reversing process is performed on a 4-bit address being output by setting signal PSIZE4 high which activates transmission gates 134a–134d. In this case, transmission gate 134a couples bit P0 to the selected input of multiplexer 128d for output as bit MD3, transmission gate 134b transfers bit P1 to the selected input BIT4 of multiplexer 128c for output as bit MD2, transmission gate 134 couple bit P2 with the selected input BIT4 of multiplexer 128b for output as bit MD1 and finally transmission gate 134d transfers bit P3 to the selected input BIT4 of multiplexer 128a to be output by latch 126a as bit MD0.

When eight bits are being output from selector 78, two modes are available: the "normal" mode and the "special" nibble mode. Both modes are available in the Big and Little Endian formats. In the normal mode (with the nibble flag NF set low), when Big Endian data is being processed, the signal BIG is again set high to select the BIT4 inputs to multiplexers 128a–128h. Control signal PSIZE8 is set high which activates transmission gate 135b and transmission gate 136ba–136d. Transmission gates 136a–136d take bits P4–P7 and provide them to a selected inputs BIT4 of multiplexers 128a–128d to be output as bits MD3–MD0 respectively through latches 126 (i.e., both shifted up and reversed). Bits P0–P3 are coupled to the selected inputs BIT4 of multiplexers 128d–128h such that they are output as bits MD7–MD4 respectively (i.e., shifted downwards and reversed).

In the "special" nibble mode and where word bit ordering reversal is required when data is being received in the Big Endian format, both control signal BIG and control signal NF (nibble flag) are set high. Again, when signal BIG is set high the BIT4 inputs to multiplexers 128a–128h are activated. With both control signal BIG and the nibble flag (NF) set high, transmission gates 135a and 135c are activated. Transmission gates 134a–134d reverse the bits at inputs P0–P3 such that the bit at P0 is output as bit MD3, the bit at input P1 is output as bit MD2, the bit at input P2 is output as bit MD1, and the bit at input P3 is output as bit MD0. At the same time, gates 136a–136d are deactivated.

In the case where Little Endian formatted data is being received at pins P0–P31 and in the special nibble mode, control signal BIG is set low and the nibble flag (NF) is set high. With control signal BIG set low, the BIT1 input to multiplexers 128a–128h are selected. Transmission gates 144a–144d are activated which shift up the bits received at inputs P4–P7 (without reversal) to be latched by latches 126a–126b and output on output MD0–MD3 respectively.

When overlay data is being passed through the pseudo-color path, selector 78 must also account for differences in the location of the overlay data in the 16- and 32-bit words being received at inputs pins P0–P31 corresponding to the different operating modes and data formats (see FIGS. 5 and 6). When operating in the Little Endian data format, two 24-bit true color modes may be used. In the Mode F the overlay data is input through pins P0–P7. In Mode E however the overlay data is received through pins P24–P31. To account for this difference in the data structures when operating in the Little Endian format in Mode E as depicted in FIG. 5, transmission gates 146a–146h are activated and transmission gates 148a–146h are deactivated. In this case the overlay data appearing at pins P24–P31 are shifted upwards into the positions normally occupied by the bits received at inputs P0–P7. In the Little Endian mode, the word ordering of the overlay data remains the same and the data is passed through multiplexer 106a–106h, latches 108a–108h and circuitry 124 on the next two DOT clocks. The same shifting of the overlay data at the inputs to the selector 78 is performed when operating in the Big Endian data format and in Mode F, the only difference being that the bit ordering of the overlay word is later reversed by circuitry 124 as previously discussed.

When operating in the Little Endian format and in Mode A as shown in FIG. 5 (i.e. one bit of overlay and fifteen bits of true color data) the overlay bit is received on input pin P15 and shifted to the P0 bit position by the activation of transfer gate 150 and the deactivation of transmission gate 148a. On the next DOT clock, the one bit of overlay is latched into latch 108a and passed to circuitry 124 for output. When operating in the Big Endian format and in Mode A, the overlay data is already coupled to input pin P0, as depicted in FIG. 6, and therefore is directly latched into latch 108a and thereby passed to circuitry 124.

When operating in the Little Endian format and in Mode C (i.e., two 16-bit words each having one bit of overlay data and fifteen bits of true color data), the overlay bit received at input pin P15 is coupled to the P0 bit position through transmission gate 150 while the overlay bit for the second word received at input pin P31 is shifted to the P8 bit position through transmission gate 154. On the next DOT clock, the overlay bit for the first word is latched by latch 108a and provided to circuitry 124 for output. At the same time, the overlay bit for the second word is latched by latch 108h. The data latched at the output of transmission gate 108h is then shifted through transmission gate 116a and multiplexer 106a to the input of latch 108a. On the next DOT clock, the overlay bit for the first word is latched out of circuitry 124 through latch 126a while the overlay bit for the second word is latched to the input of circuitry 124 by latch 108a. The subsequent DOT clock latches out the overlay bit for the second word through latch 126 of circuitry 124.

When data is received in the Big Endian format (as wired to pins P0-P31 as shown in FIG. 6) and when operating in Mode C, the overlay data received at pin P0 is shifted to the P7 bit position through transmission gate 156 and the overlay bit for the second word, received at input pin P16, is shifted to bit position P15 by transmission gate 158. On the next DOT clock, the overlay bit for the first word is latched by latch 108a and thereby provided to the inputs to circuitry 124. Control signal PSIZE8 and Big/Little Endian control signal BIG have been set high such that the overlay bit for the first word now in the bit position P7 is transferred by transmission gate 136d to be latched out in the MD0 bit position on the next DOT clock. At the same time, the overlay bit for the second word is latched by latch 106m and held at the input of data selector 106h through transmission gate 116h. On the next DOT clock, as the overlay bit for the first word is being latched out at output MD0, the overlay bit for the second word is latched by latch 106h into the P7 input to circuitry 124. Again, since PSIZE8 is set high, the overlay bit for the second word is transferred to the input of latch 126a to be output on output MD0 at the next DOT clock.

Figure 8:
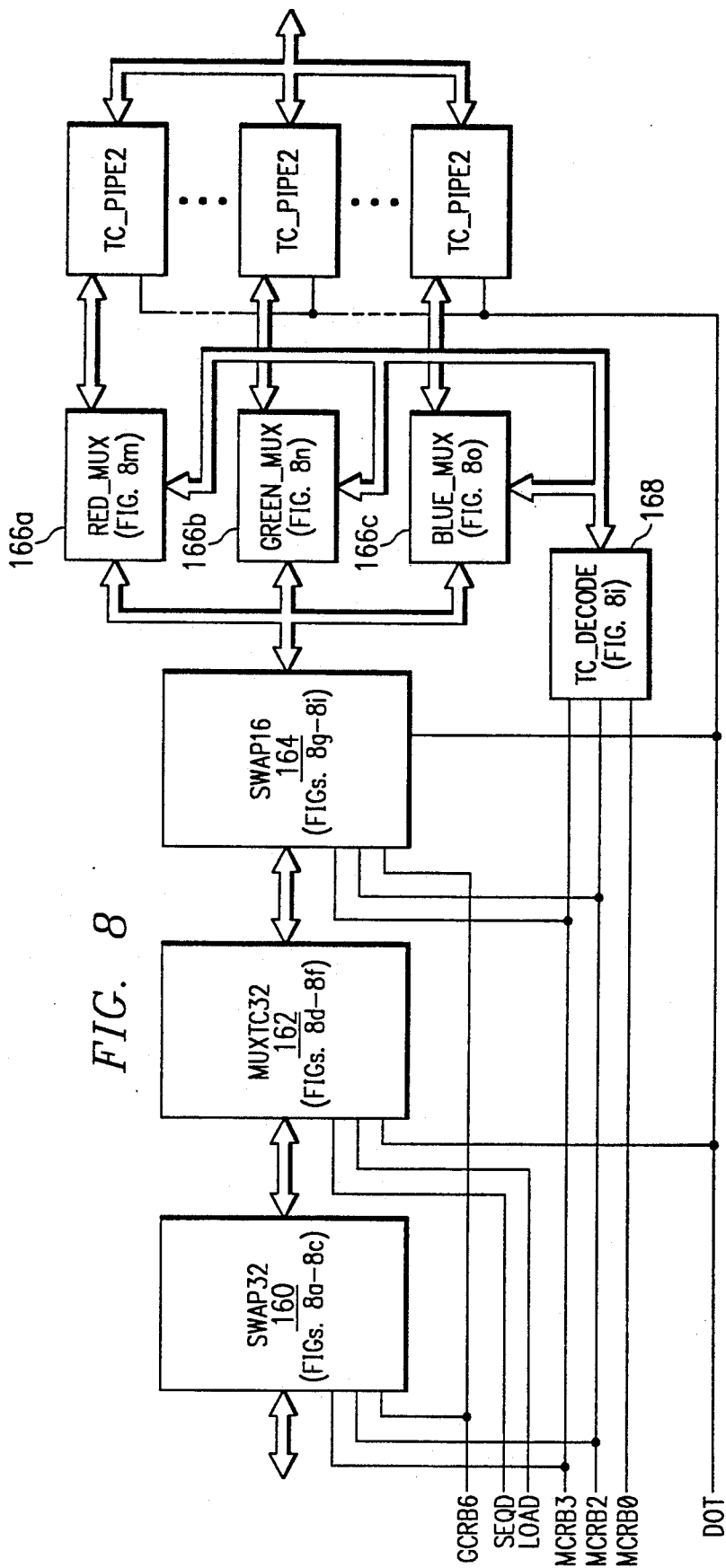
FIG. 8 is a functional block diagram of the True Color Mode Selector and Big/Little Endian interpreter circuitry 83 and true color pipeline delay circuitry 82 of FIG. 4.
Figure 8A:
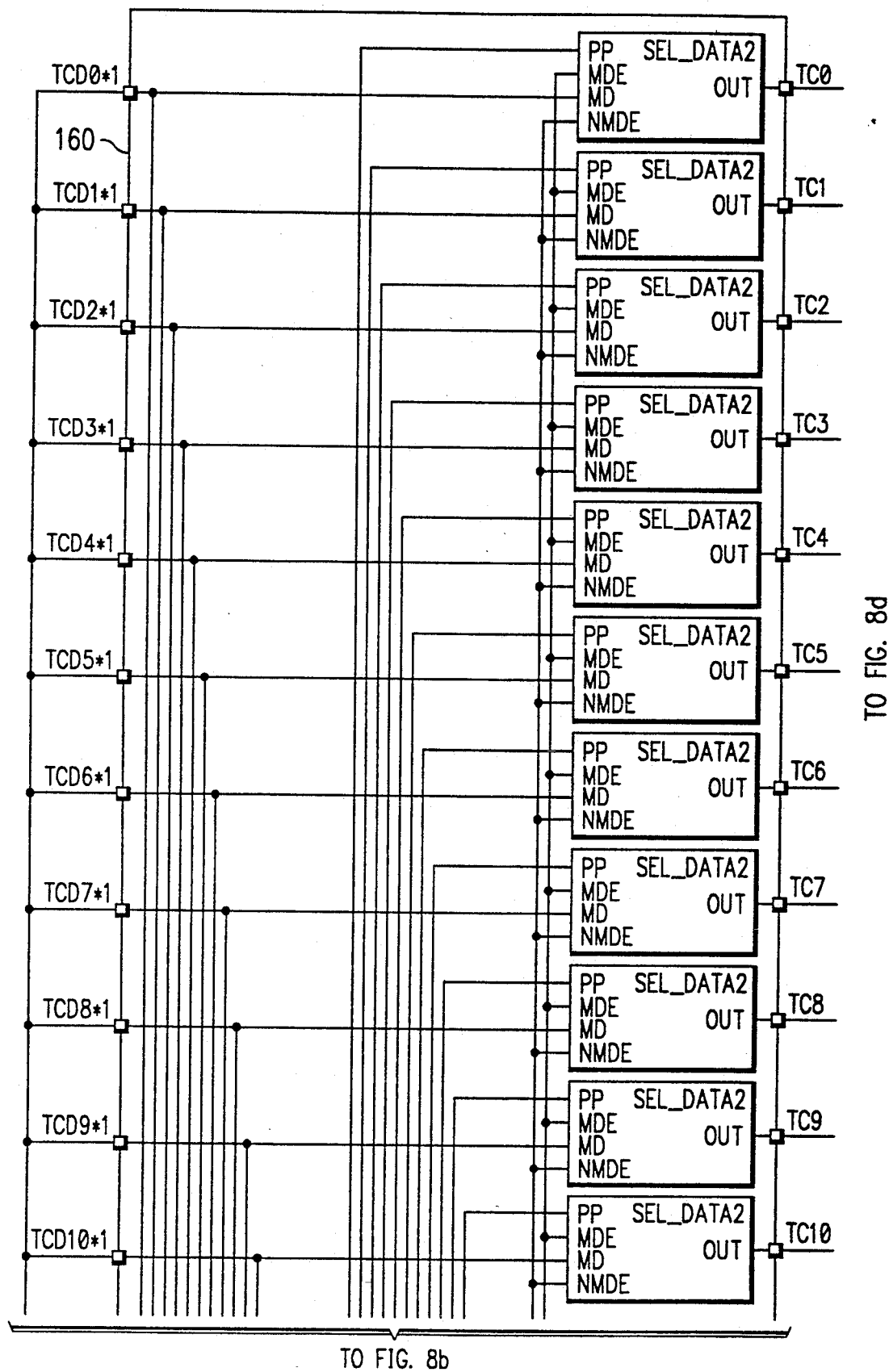
FIGS. 8a–8u are complete functional level electrical schematics of the selector/interpreter and pipeline delay circuitry of FIG. 8.
Figure 8B:
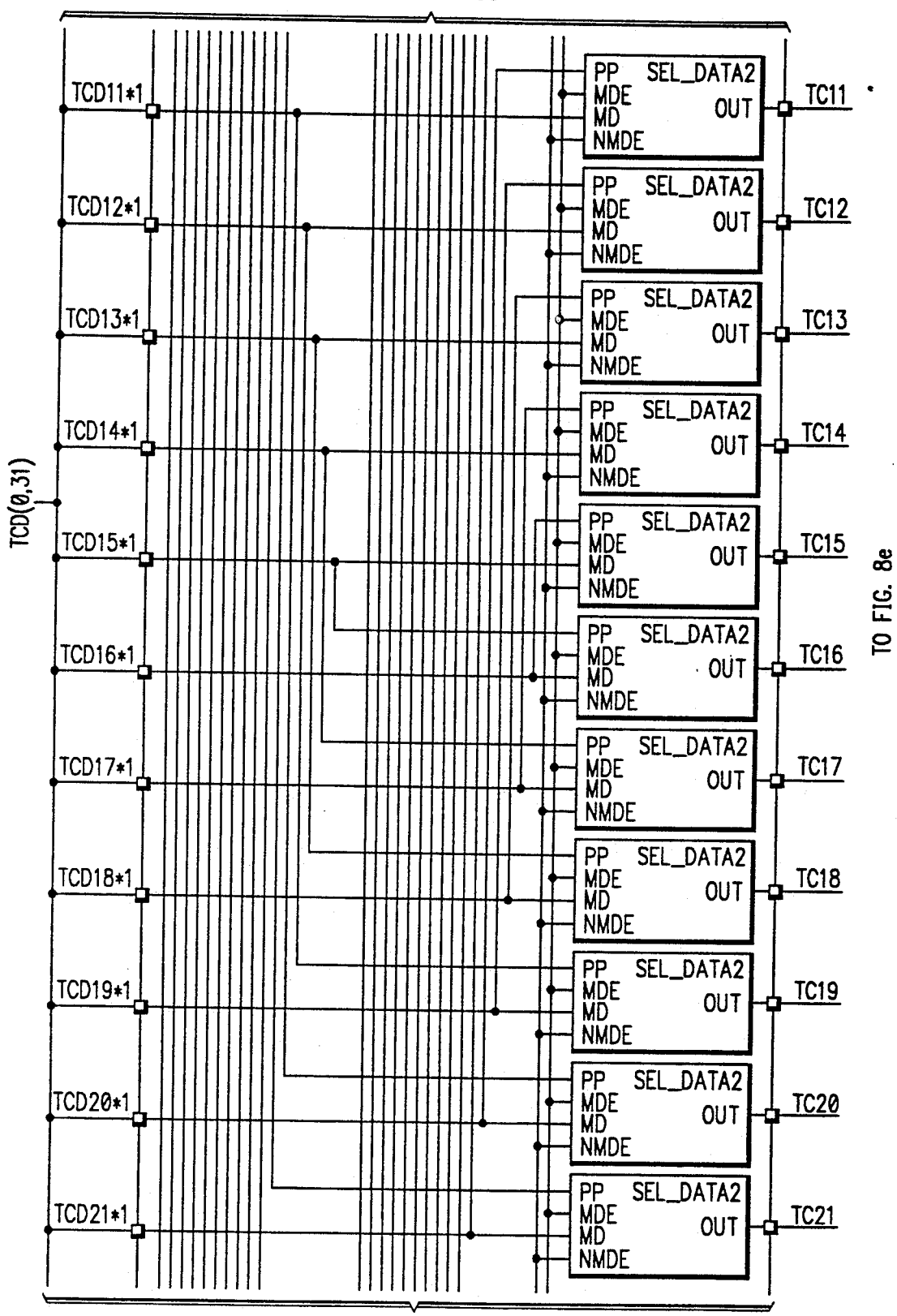
Figure 8C:
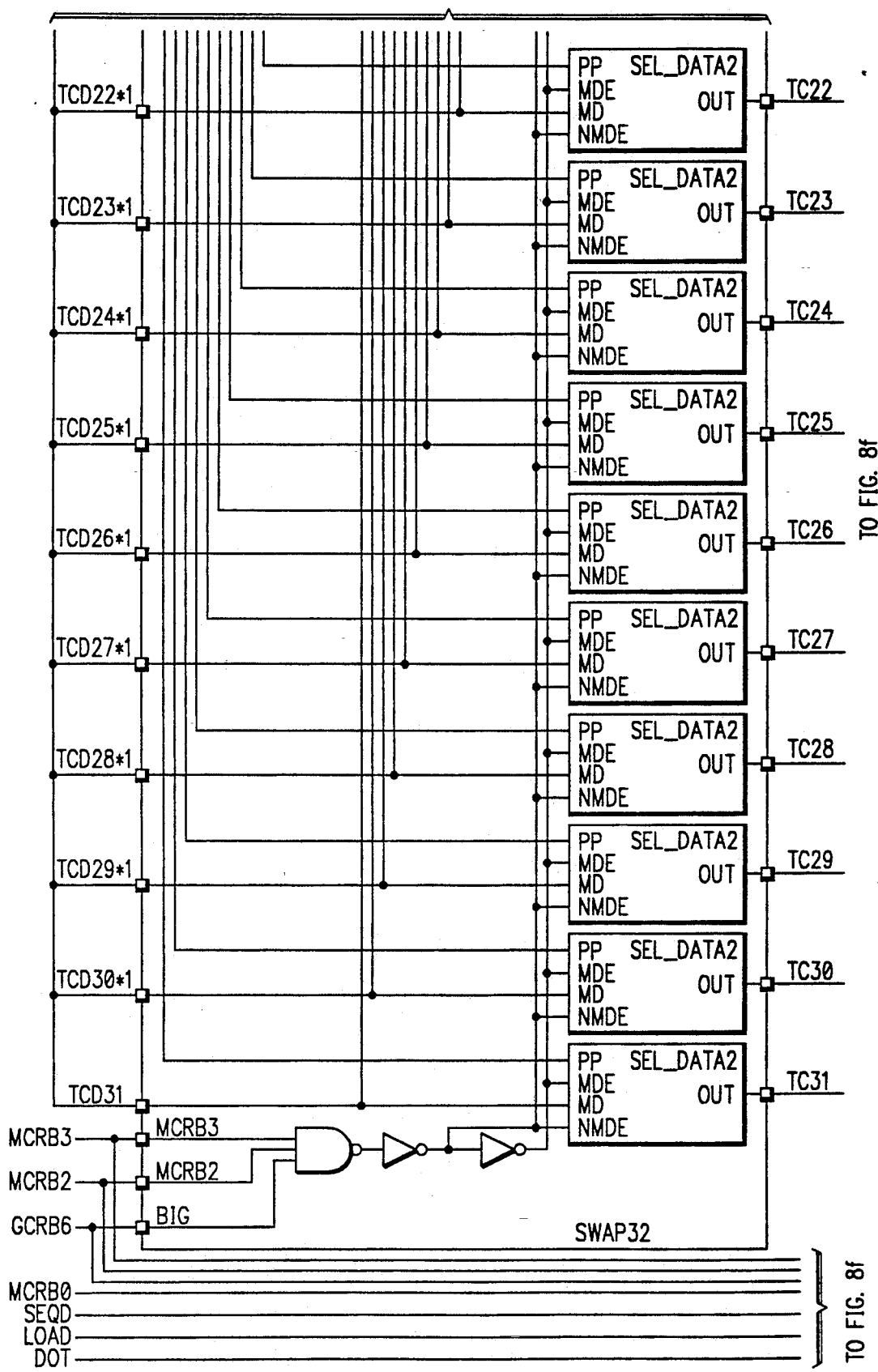

FIGS. 8a-8c are detailed electrical schematic diagrams of true color mode selector and Big/Little Endian interpreter circuitry 83 and true color pipeline delay circuitry 82. When data is received in the Big Endian format, as wired in accordance with FIG. 6, and one of the two 24-bit true color modes is selected (i.e., either Mode E or F) swapping circuitry 160 (FIGS. 8a-c) reverses all thirty-two bits received from input latch 74. The reversal of the bits by swapping circuitry 160 sets up the correct bit ordering for each word of true color data and re-reverses the word ordering of the true color data. When Little Endian data has been received, in either the E or F 24-bit modes, all thirty-two bits of data are simply latched straight through swapping circuitry 32. Additionally, in all 16-bit modes (both Big and Little Endian formats) data received at the inputs to swapping circuitry 160 is passed through without change.

Figure 8D:
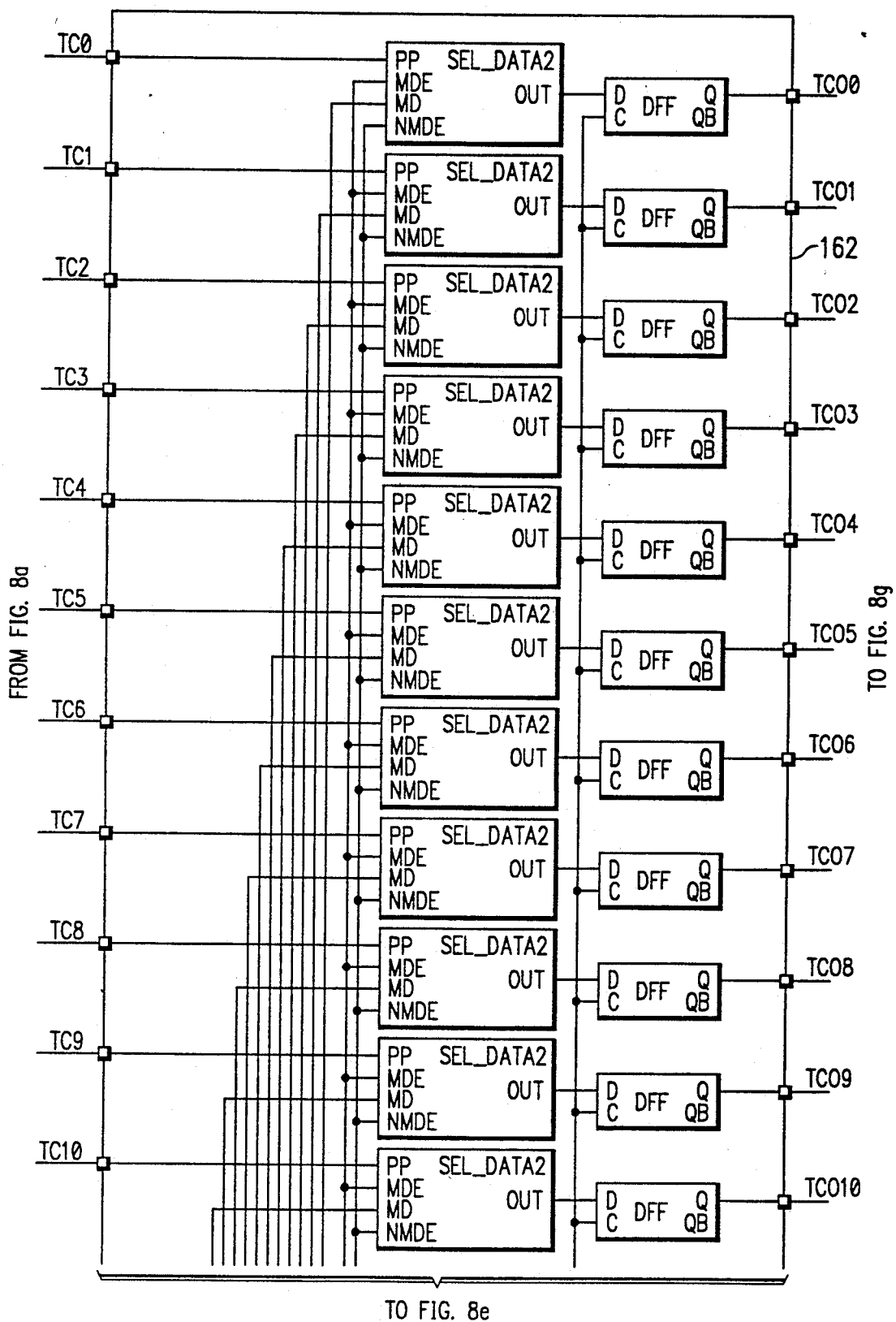
Figure 8E:
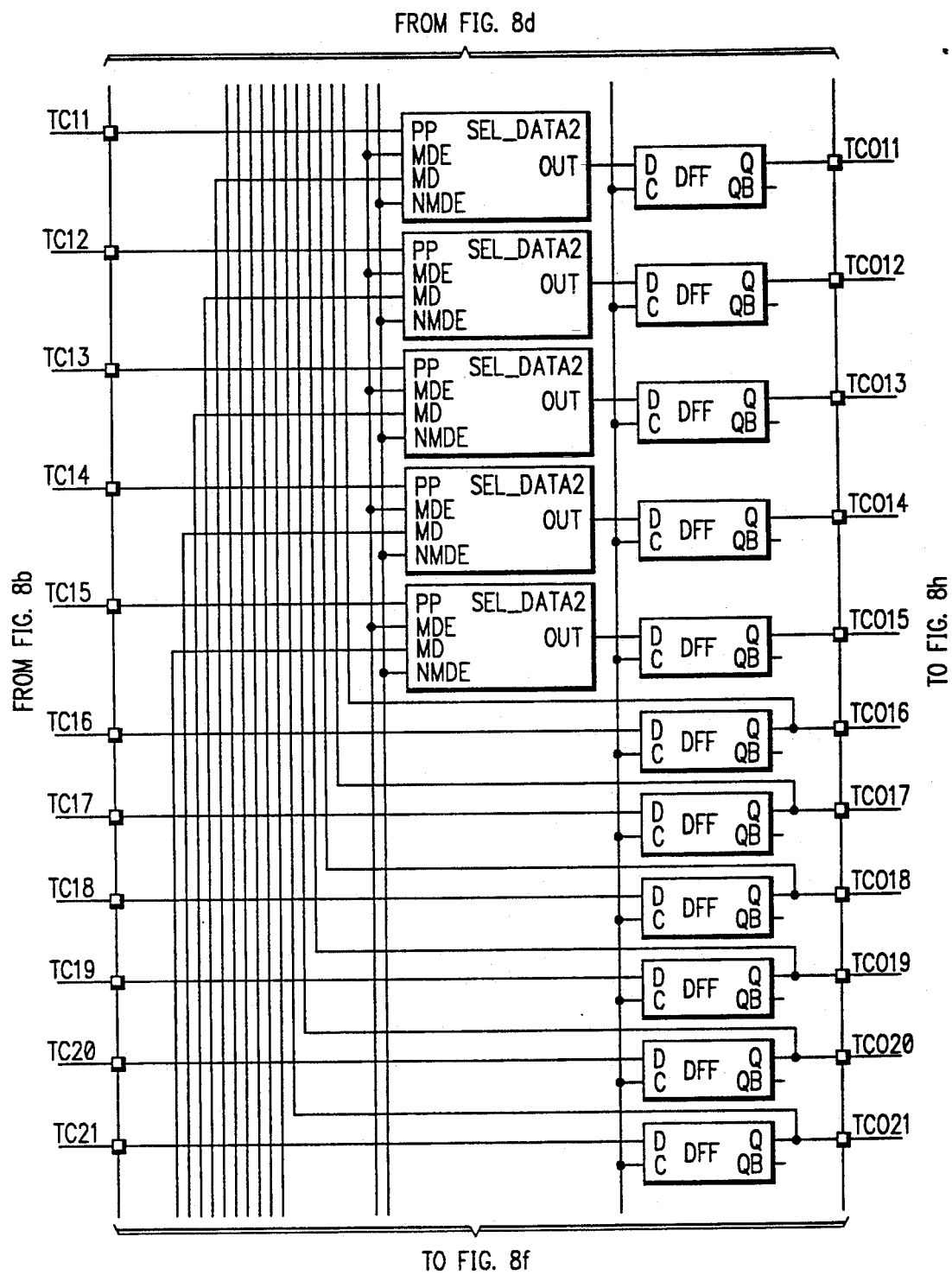
Figure 8F:
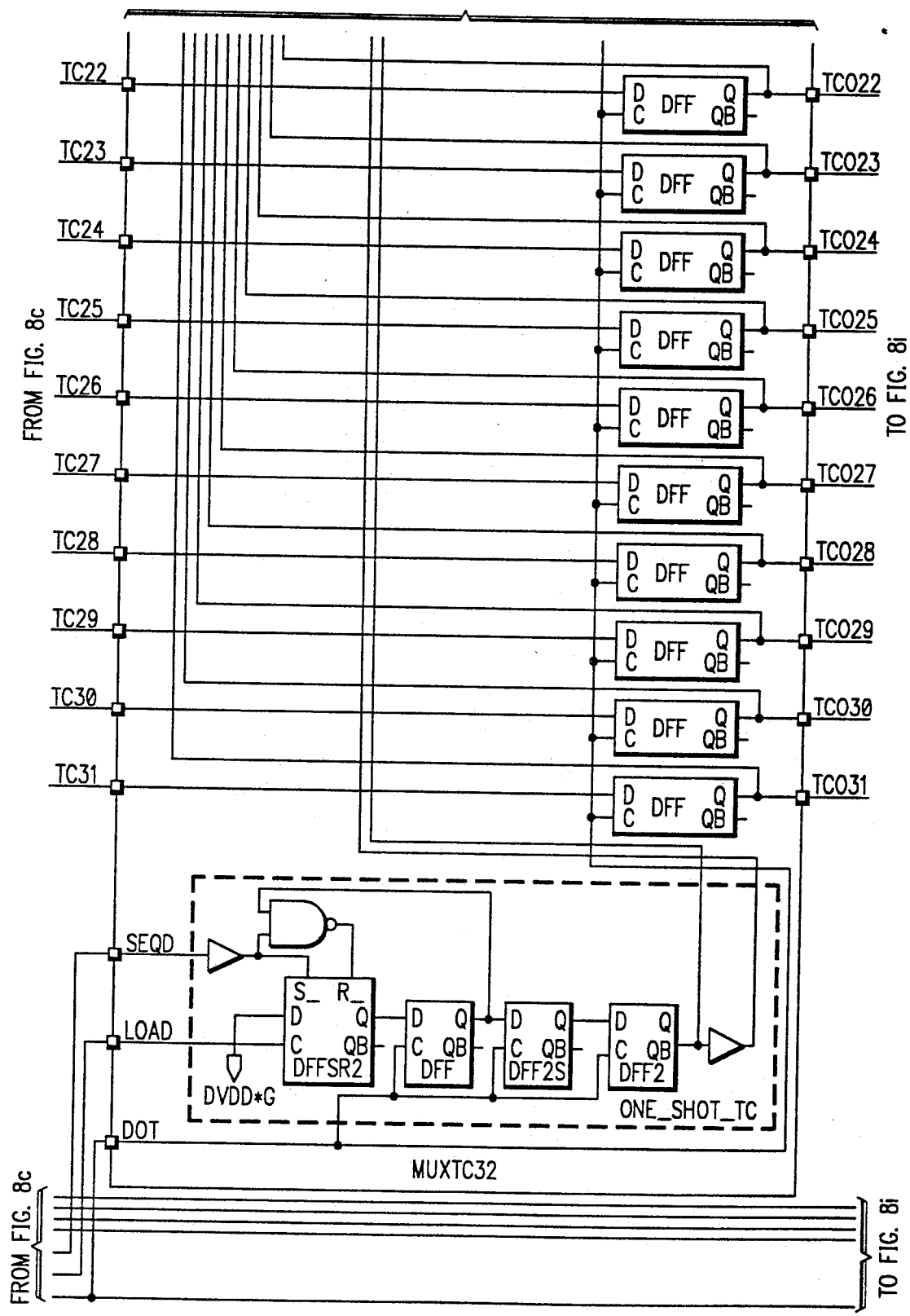

The thirty-two bits of data output from swapping circuitry 160, either reversed or unchanged are received at the inputs to multiplexing circuitry 162 (FIGS. 8d-8f). In any of the 24-bit modes (irrespective of the Big Endian formatting), all thirty two bits pass through multiplexing circuitry 162 with one DOT clock delay. The circuit then resets awaiting the next thirty-two bits. In the A and B Modes, the sixteen bits received at inputs TC0-TC15 are latched through and then the multiplexer is again reset for the next thirty-two bits from swapping circuitry 160 (the bits received at inputs TC16-TC31 are "don't cares"). In the C and D Modes, however, the sixteen bits received at inputs TC0-TC15 are passed through from A (PP) inputs of 16 selectors (see FIGS. 8d and 8e) and latched out on the first DOT clock. At the same time the bits received at inputs TC16-TC31 are latched and shifted up sixteen positions to the B (MD) inputs of the 16 selectors. On the second DOT clock, the B (MD) inputs are selected and the bits received on pins TC16-TC31 are latched out at outputs TCO0-TCO15.

Figure 8G:
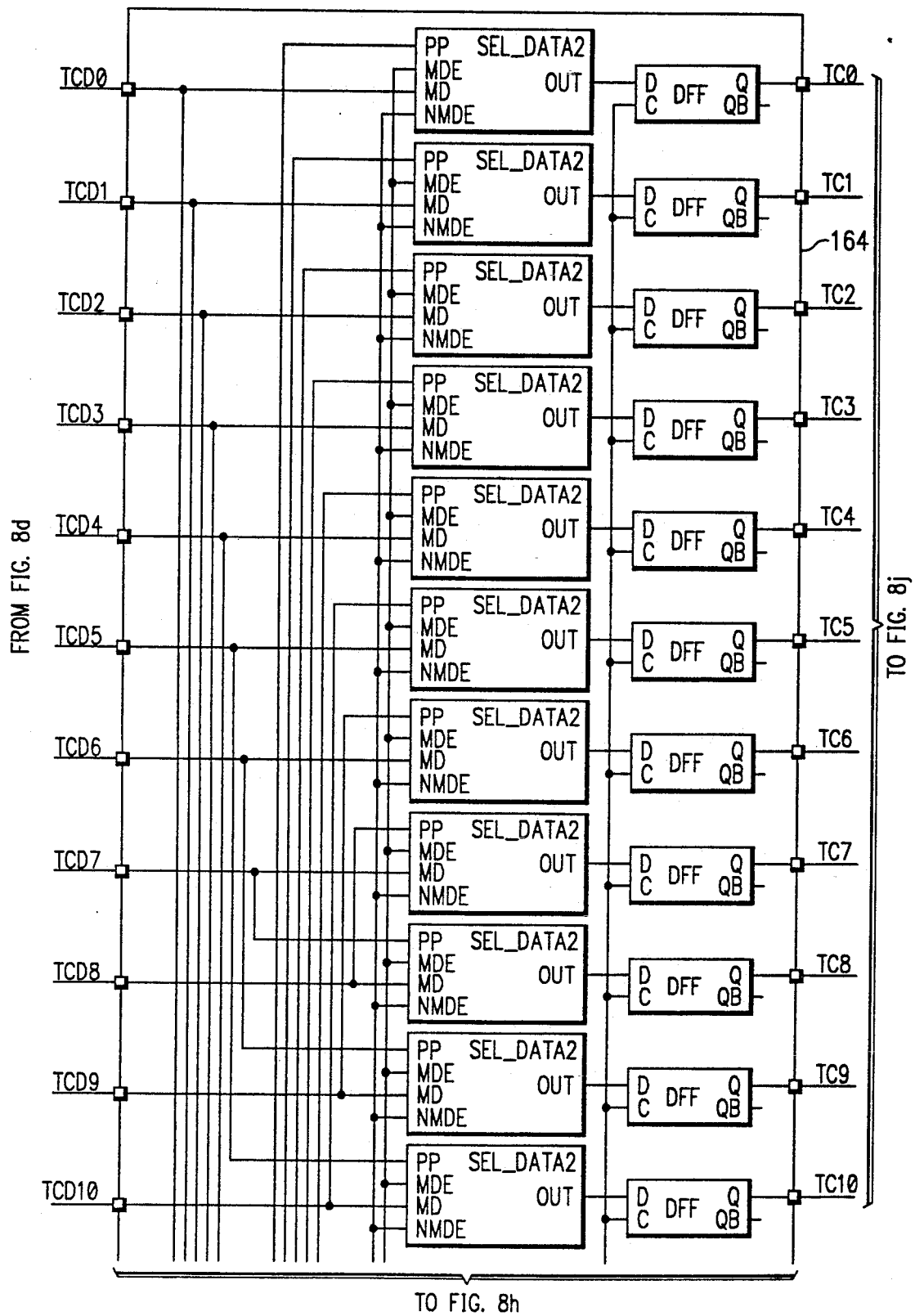
Figure 8H:
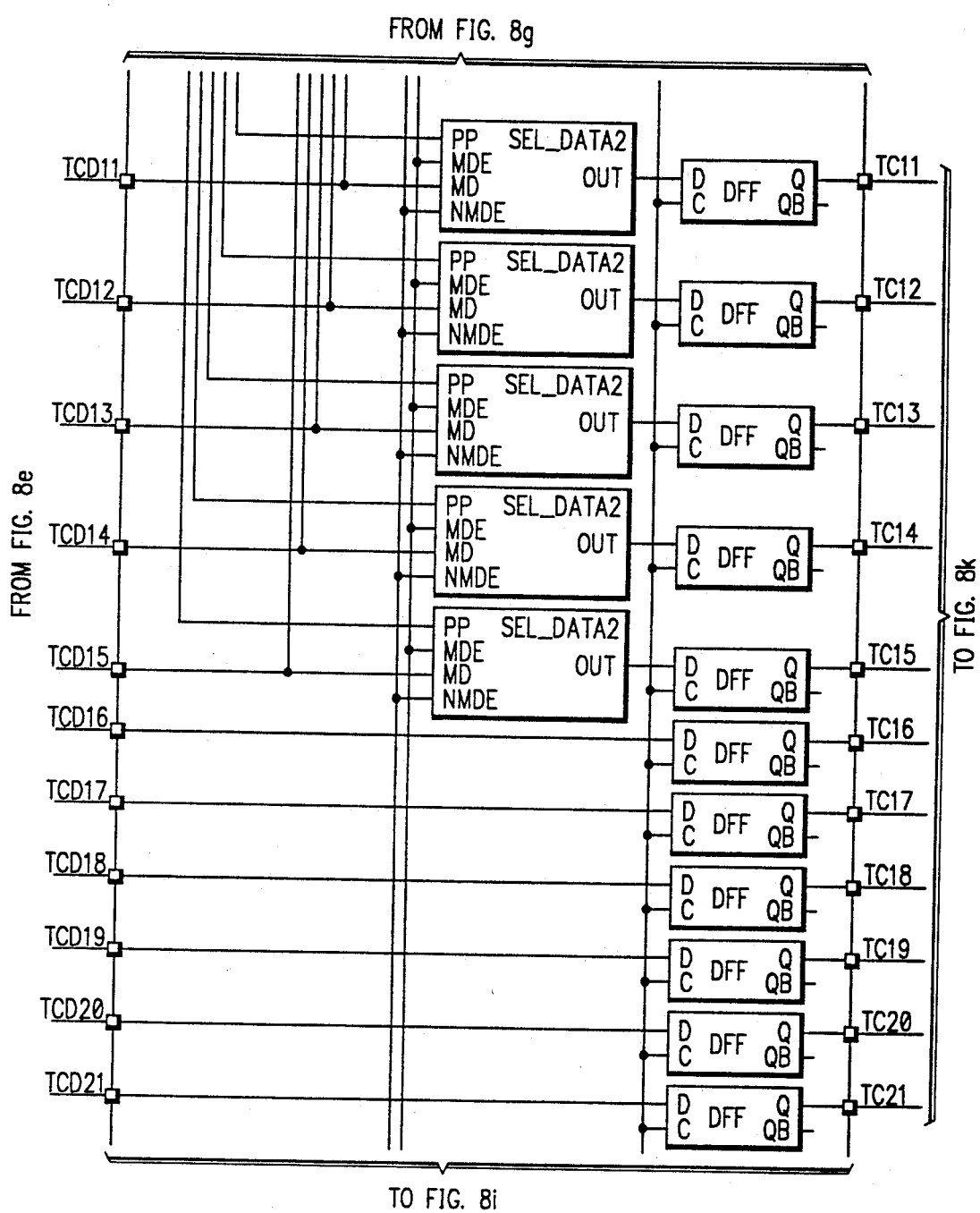
Figure 8I:
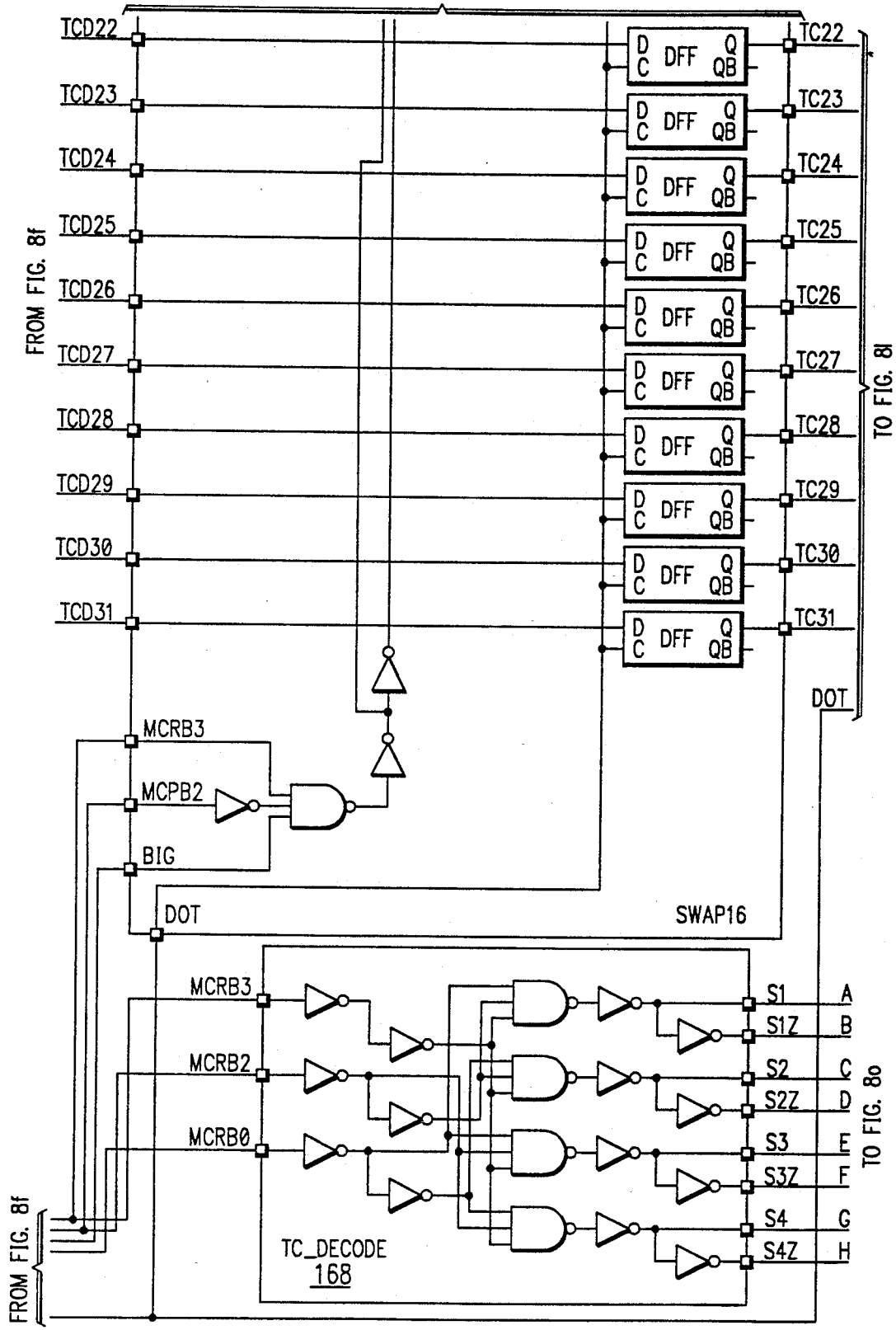
Figure 8J:
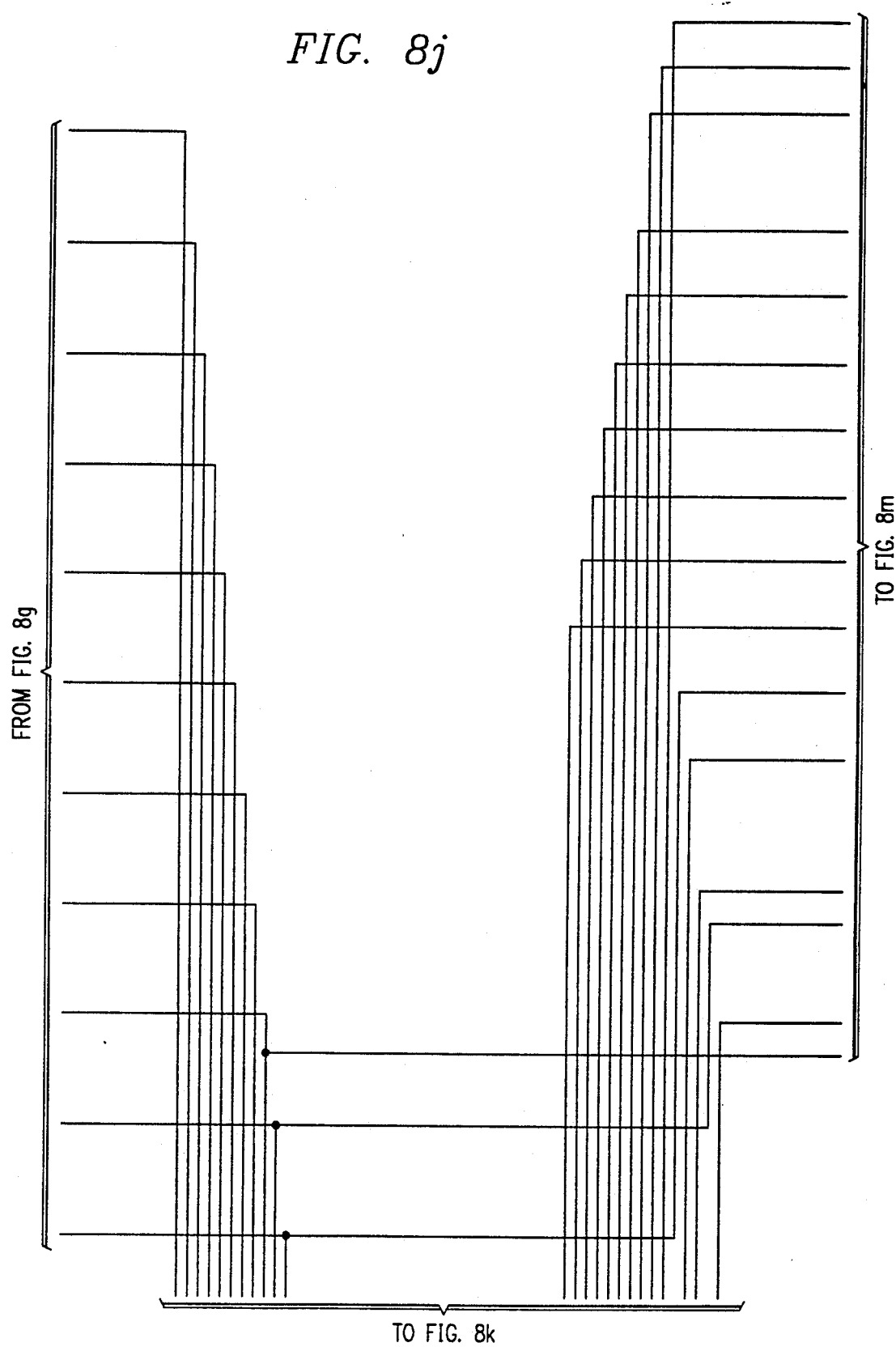
Figure 8K:
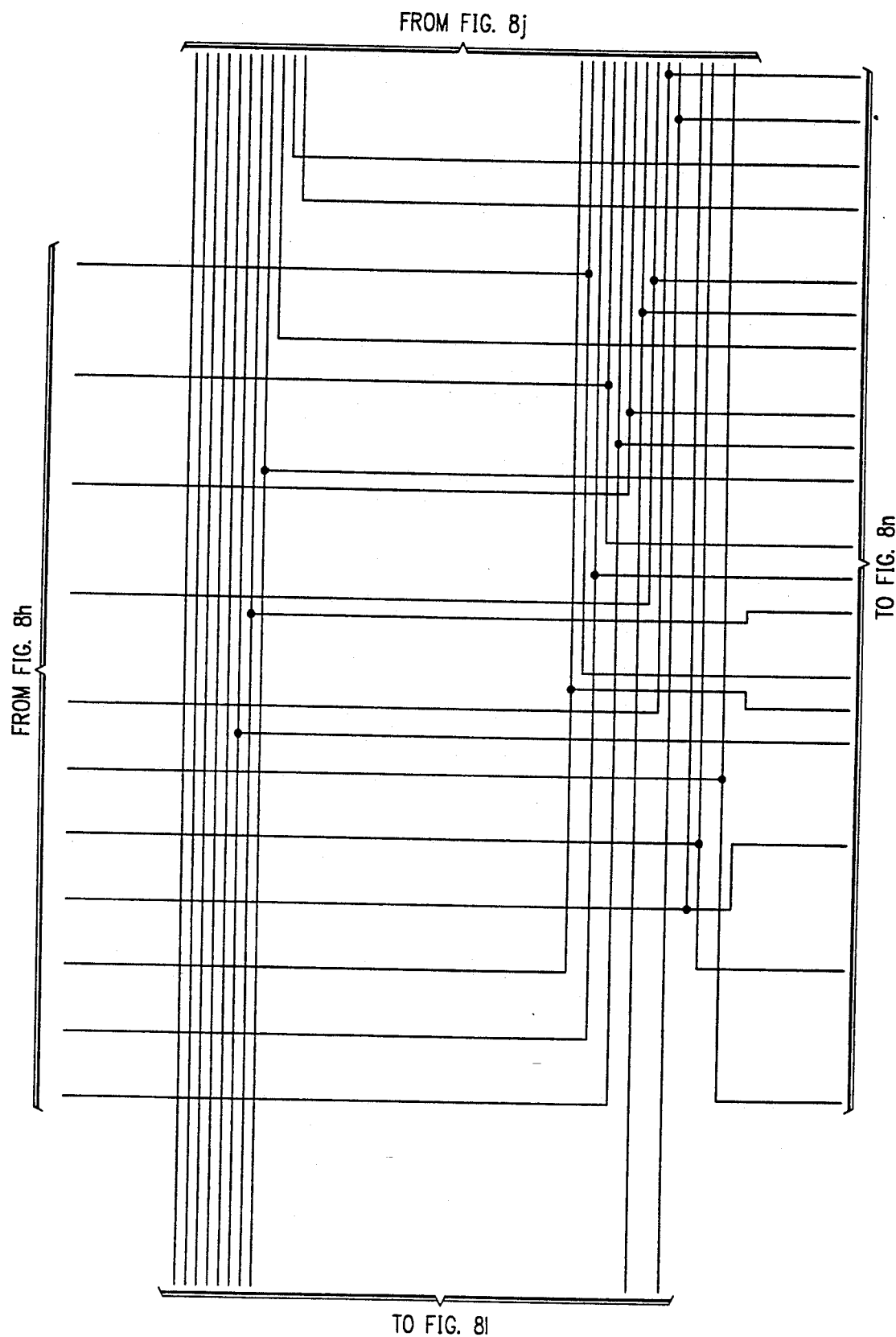
Figure 8L:
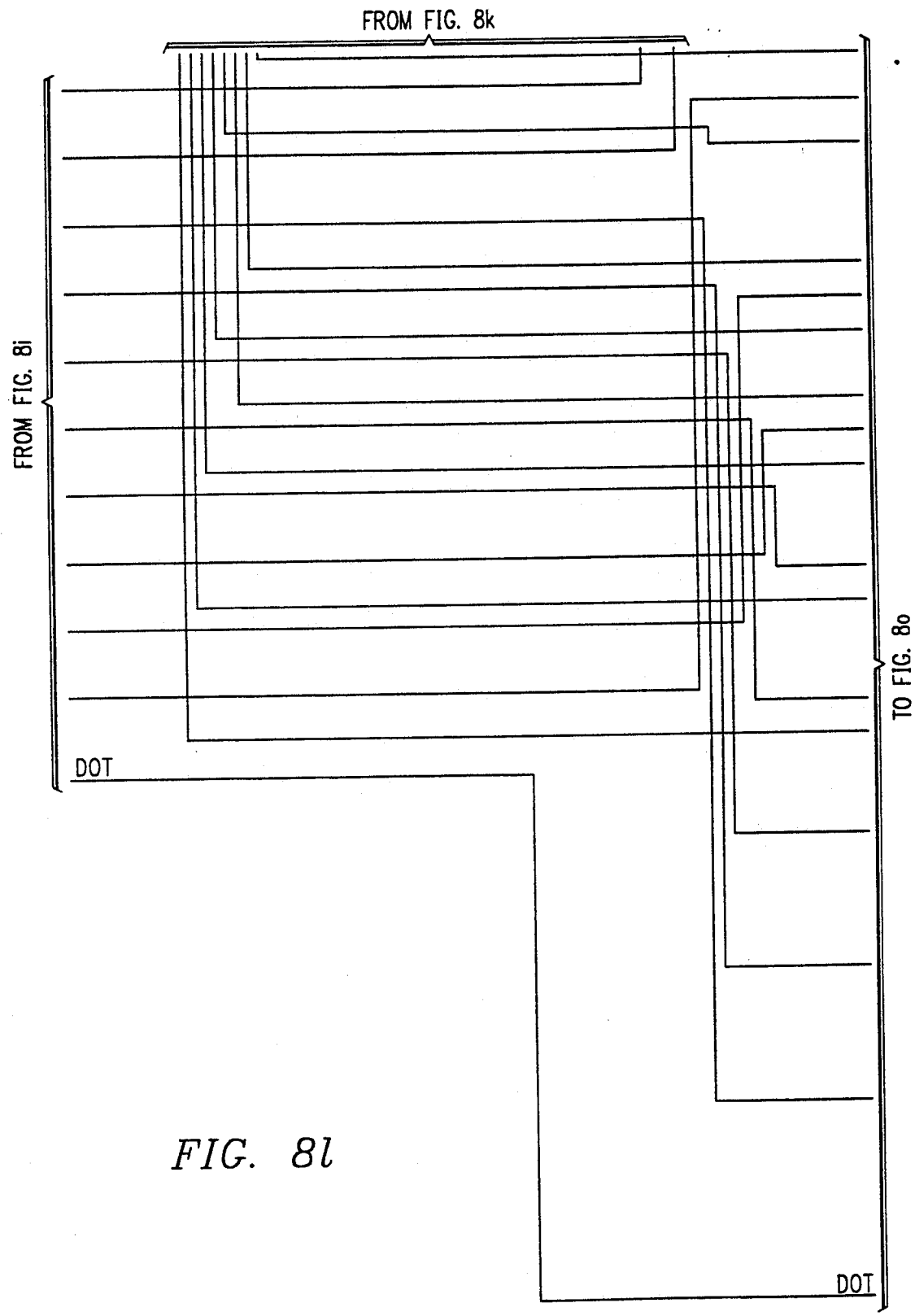
Figure 8M:
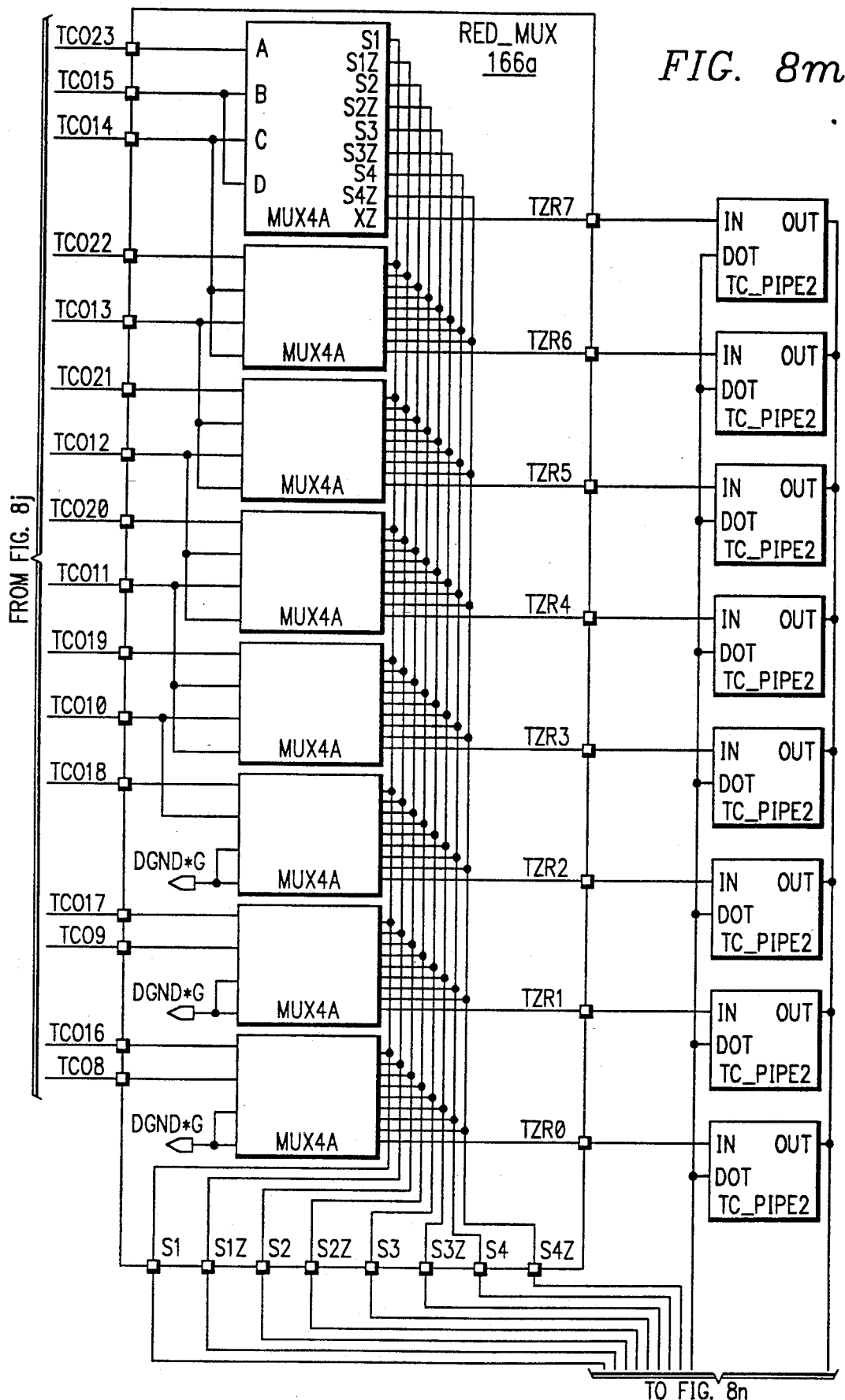
Figure 8N:
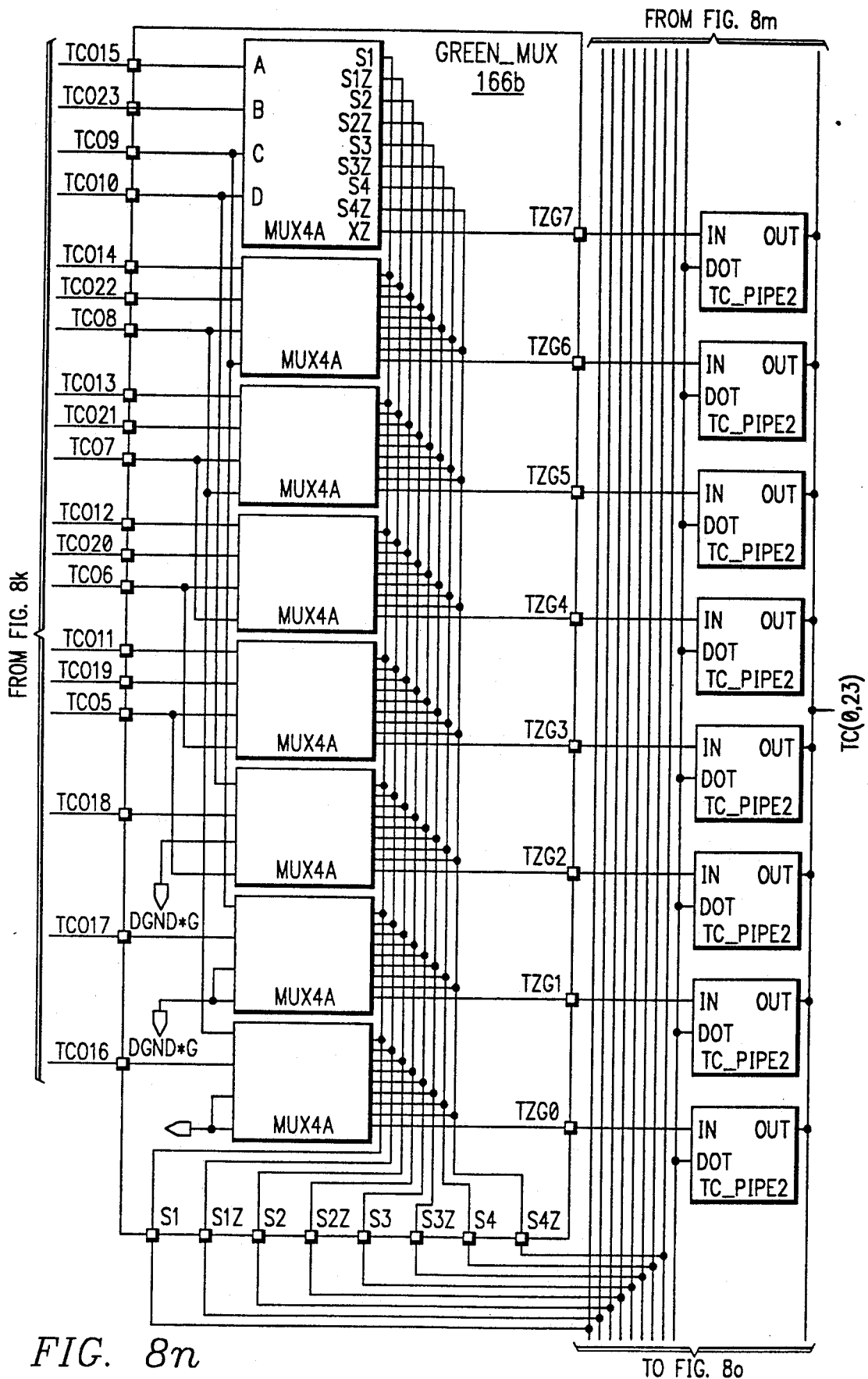
Figure 8O:
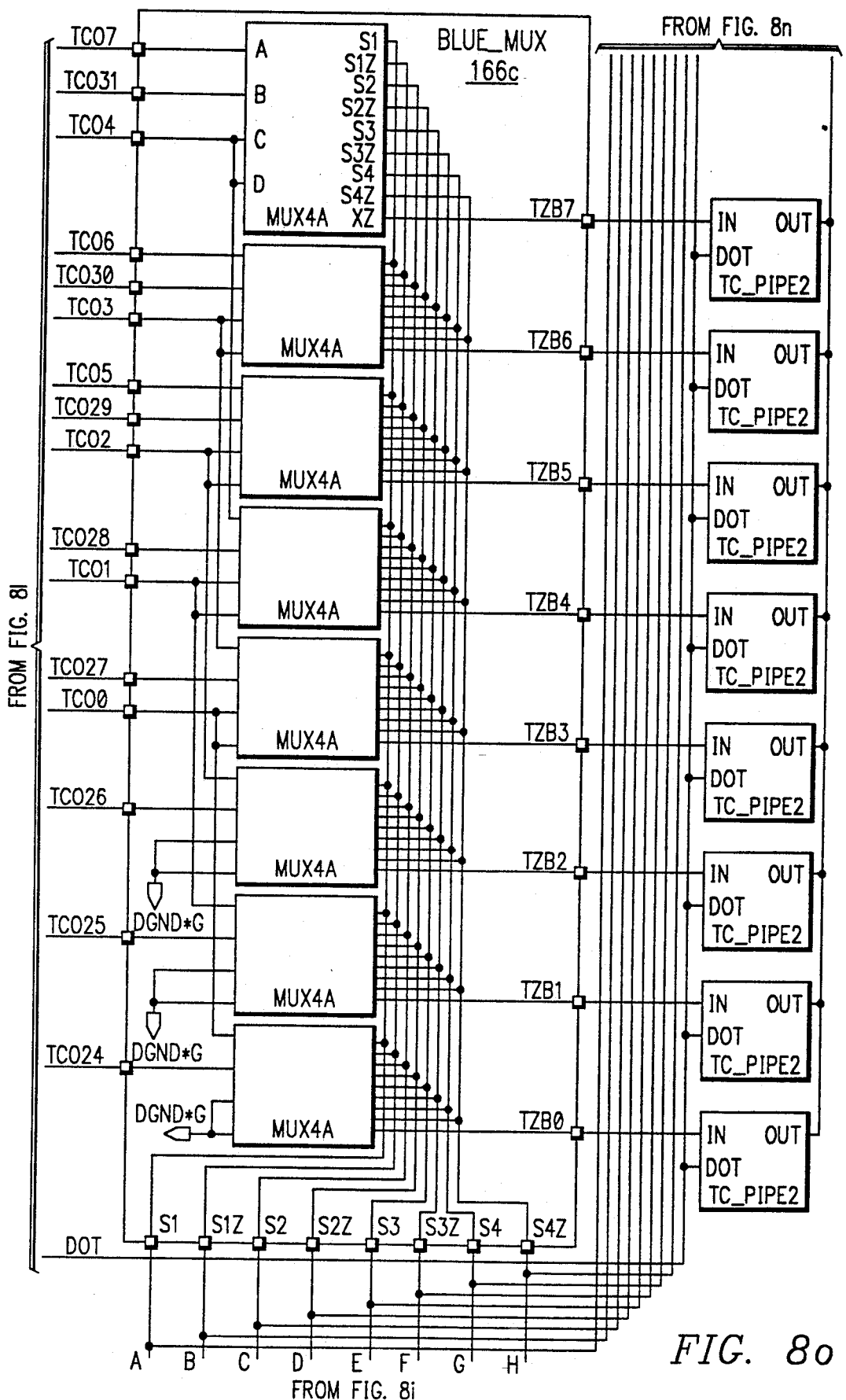

When operating in the Big Endian format and in one of the 16-bit modes, all sixteen bits of each 16-bit word received from multiplexing circuitry 162 are reversed by 16-bit swapping circuitry 164 (FIGS. 8g-8i). In the Little Endian 16-bit modes and in all 24-bit modes, the data received at inputs TCD0-TCD31 (inputs TCD0-TCD15 in the Little Endian 16-bit modes) is simply passed through to outputs TC0-TC31 without change. As was the case in the swap of the thirty-two bits of data, the reversal of the sixteen bits by swapping circuitry 164 in the Big Endian mode, sets the bit ordering correctly and re-reverses the word ordering.

True color multiplexer 166a-166c as controlled by TC decode circuitry 168 (FIG. 8i) provide respectively the red, green and blue true color data to output multiplexer 86. In Mode E (24-bit true color) (in the Little Endian mode after direct pass through and after bit/word reversal in the Big Endian mode), the bits at outputs TC0-TC7 of swapping circuitry 164 are selected for output by blue multiplexer 166c, the bits at outputs TC8-TC15 are selected by green multiplexer 166b for output, and the bits at outputs TC16-TC23 of swapping circuitry 164 are selected for output by red multiplexer 166a. In the E Mode, bits TC24-TC31 comprise the overlay data which is proceeding in parallel through the pseudo-color path, and is ignored by multiplexers 166.

When operating on in Mode F (in the Little Endian mode after direct pass through and after bit/word reversal in the Big Endian mode) the bits at output TC8-TC15 of swapping circuitry 164 are selected and output by red multiplexer 166a, the bits at outputs TC16-TC23 are selected and output by green multiplexer 166b and the bits appearing at outputs TC24-TC31 are selected and output by blue multiplexer 166c. In this mode, the bits appearing at outputs TC0-TC7 of swapping circuitry 164 comprise the overlay data and are ignored by the multiplexers 166.

In the 16-bit true color Modes A and C, and for each of the 16-bit true color words passed through swapping circuit 164, the five bits appearing at outputs TC0-TC4 of swapping circuitry 164 (in the Little Endian mode after direct pass through and after bit/word swapping in the Big Endian mode) are selected and output by blue multiplexer 166c, the bits appearing at outputs TC5-TC9 selected and output by green multiplexer 166b, and the bits appearing at outputs TC10-TC14 are selected and output by red multiplexer 166c. The overlay bit appearing at output TC16 of swapping circuitry 164 is ignored. In 16-bit true color Modes A and C, where five bits each of red, green, and true color data are being output, the remaining three outputs of the 8-bit wide multiplexers 166a-166c are grounded.

In either 16-bit true color Mode B or 16-bit true color Mode D, (the five, six, five data structures), the five bits appearing at outputs TC0–TC4 of swapping circuitry 164 (in the Little Endian mode after direct pass through and after bit/word swapping in the Big Endian mode) are selected and output by blue multiplexer 166c, the six bits appearing at outputs TC5–TC10 selected and output by green multiplexer 166b, and the five bits appearing at outputs TC11–TC15 selected and output by red multiplexer 166a. Again, the unused outputs of the 8-bit wide multiplexers 166a-166c are grounded.

Although the present invention and its advantages have been described in detail, it should be understood that various changes, substitutions and alterations can be made herein without departing from the spirit and scope of the invention as defined by the appended claims.

What is claimed is:

1. A color palette comprising:
    a plurality of ordered input terminals for receiving a plurality of bits of data having an order; and
    a true color data path comprising:
        first circuitry coupled to said input terminals for selectively reversing the order of said plurality of bits of data;
        second circuitry coupled to said first circuitry and operable in a first mode to pass all of said plurality bits of data received from said first circuitry and in a second mode pass at least one word comprising selected ones of said plurality of bits, said selected ones of said bits having a bit order;
        third circuitry coupled to said second circuitry and operable to pass all of said bits of data received from said second circuitry in said first mode and operable to selectively reverse said ordering of said selected ones of said bits and pass said at least one word received from the second circuitry in said second mode; and
        fourth circuitry coupled to said third circuitry and operable to receive bits of data passed from said third circuitry and select for output as at least one word of true color data at least some of said bits.

2. The color palette of claim 1 wherein at least one bit of said plurality of bits comprises overlay data.

3. The color palette of claim 2 and further comprising:
    a pseudo-color data path coupled to said input terminals and operable to receive said overlay data and output a color data word stored in a memory in response; and
    output circuitry coupled to said memory and said fourth circuitry and operable to select for output between a said color data word output from said memory and a said word of true color data output from said fourth circuitry.

4. The color palette of claim 1 and further including a pseudo-color path comprising:
    a pseudo-color selector having inputs coupled to said input terminals for receiving at least some bits of said plurality of bits and outputting at least one recall address in response, bits forming said recall address having a bit ordering;
    an interpreter provided at outputs of said selector for selectively reversing said bit ordering of said bits forming said recall address; and
    a memory device coupled to said selector and having a plurality of data storage locations, each said location having an associated said recall address, said memory operable to output a color data word written into a said location in response to a said associated recall address from said selector.

5. The color palette of claim 1 wherein said fourth circuitry is operable to output plurality of ordered words of true color data.

6. A color palette comprising:
    a plurality of ordered input terminals for receiving in parallel m bits of data, wherein m is a positive integer, said m bits of data having a bit ordering;
    a pseudo-color path comprising:
        a pseudo-color selector having a plurality of ordered inputs coupled to said input terminals for receiving at least some of said m bits and outputting at least one recall address in response, bits forming said recall address having a bit ordering;
        an interpreter provided at outputs of said selector for selectively reversing said bit ordering of said bits forming a said recall address; and
        a memory coupled to said selector and having a plurality of data storage locations, each said location having an associated said recall address, said memory operable to output color data words written into a said location in response to a said associated recall address from said selector; and a true color path comprising:
        a first interpreter coupled to said input terminals for selectively reversing said bit ordering of said m bits having;
        a true color selector coupled to said first interpreter and receiving said m bits, said true color selector selectively passing unchanged said m bits received from said first interpreter in a first mode, selectively outputting a p bit word from said m bits in a second mode, and sequentially outputting at least two words of p bits each from said m bits in a third mode, wherein p is a positive integer;
        a second interpreter coupled to said true color selector for selectively reversing a bit ordering of a said p-bit word received from said true color selector in said second and third modes, said second interpreter passing unchanged said m bits of data in received from said true color selector in said first mode; and
        true color output multiplexing circuitry coupled to said second interpreter circuitry and operable select to output a plurality of multiple bit words of true color data from bits received from said second interpreter.

7. The color palette of claim 6 and further comprising a color palette output multiplexer coupled to said memory and said true color output multiplexing circuitry and operable to select for output between said words of true color data output from said true color output multiplexing circuitry and color data words output from said memory in response to a said recall address.

8. The color palette of claim 6 and further comprising overlay data shifting circuitry coupling said ordered input terminals and said inputs of said selector and operable to shift at least one bit in said ordering of said m bits of data from a first position to a second position in relation to said ordered inputs of said selector.

9. The color palette of claim 6 wherein said first interpreter comprises an array of m selector circuits, each said selector circuit having a first input activated in response to a first control signal and a second input activated in response to a second control signal, said first input of a nth one of said selectors receiving an nth one of said m bits of data and said second input of said nth one of said selectors receiving an (m−n)th one of said m bits of data, wherein n is a positive integer, said first interpreter operable to reverse said ordering of said m bits of data in response to said second control signal.

10. The color palette of claim 6 wherein said true color output multiplexing circuitry comprises:
 a first multiplexer coupled to said second interpreter for selecting and outputting q bits of a said m bits of data received from said second interpreter circuitry in said first mode and q bits of each said p bits received in said second and third modes, q being a positive integer, said q bits comprising a q-bit word of red true color data;
 a second multiplexer coupled to said second interpreter for selecting and outputting r bits of said m bits of data received from said second interpreter circuitry in said first mode and r bits of each p-bit word received in said second and third modes, r being a positive integer, said r bits comprising a r-bit word of green true color data; and
 a third multiplexer coupled to said second interpreter for selecting and outputting s bits of said m bits of data received from said second interpreter circuitry in said first mode and s bits of each p-bit word received in said second and third modes, s being a positive integer, said s bits comprising a s-bit word of blue true color data.

11. The color palette of claim 6 wherein said true color selector comprises:
 an ordered array of p selectors, an nth one of said selectors having a first input coupled to an nth one of said input terminals, a second input, an output, and at least one control input and wherein n is a positive integer between 1 and p;
 an ordered array of m latches comprising first and second groups of p latches each, an input of an nth one of said latches in said first group coupled to said output of said nth one of said selectors, an input of an nth one of said latches in said second group coupled to a (p+n)th one of said input terminals, an output of said nth one of said latches in said second group coupled to second input of said nth one of said selectors; and
 control circuitry coupling said control terminals of said selectors and a clock input of each of said latches, said control circuitry operable to control said selector circuitry such that in said first mode said latches latch m bits of data for each said m bit word received at said input terminals, latch one said p bit word in said second mode and sequentially latch two p bit words in said third mode.

12. The color palette of claim 6 wherein said second interpreter comprises:
 a plurality of m input terminals;
 an ordered array of p selectors, an nth one of said selectors having a first input coupled to an nth one of said input terminals, a second input coupled to a (p−n+1)th one of said input terminals, an output, and at least one control input and wherein n is a positive integer between 1 and p;
 an ordered array of m latches comprising first and second groups of p latches each, an input of an nth one of said latches in said first group coupled to said output of said nth one of said selectors and an input of an nth one of said latches in said second group coupled to a (p+n)th one of said input terminals; and
 control circuitry coupled said control terminals of said selectors and a clock input of each of said latches, said second interpreter is operable to selectively reverse said bit ordering of said p-bit words received from said true color selector in said second and third modes, said second interpreter passing said m bits of data in received from said true color selector in said first mode.

13. The color palette of claim 6 and further comprising delay circuitry coupling said true color multiplexing circuitry and said color palette output multiplexer, said delay circuitry operable to synchronize said words of true color data and color data words output from said memory.

14. A graphics processor system comprising:
 a graphics processor controlling said system and operating in a data format selected from the Big Endian and Little Endian formats;
 a video memory coupled to said processor for storing a plurality of color codes defining a video image to be displayed as a plurality of pixels, each said color code comprising a plurality of data words formatted in accordance with said selected format such that said data words comprising a said color code have a corresponding word ordering and bits comprising a said color code have a corresponding bit ordering;
 a color palette operating in an other one of the Big Endian and Little Endian formats comprising:
  a plurality of ordered input terminals reversibly coupled to said video memory;
  a pseudo-color path comprising:
   a pseudo-color selector coupled to said input terminals for receiving said color codes and outputting at least one recall address in response, bits forming n said recall address having a bit ordering;
   an interpreter provided at outputs of said selector for selectively reversing said bit ordering of said bits forming a said recall address; and
   a memory coupled to said interpreter and having a plurality of data storage locations, each said location having an associated said recall address, said memory operable to output a color data word written into a said location in response to a said associated recall address; and
  a true color path comprising:
   a first interpreter coupled to said input terminals for selectively reversing said bit ordering of said bits comprising said color codes;
   a true color selector coupled to said first interpreter and receiving said color codes, said true color selector selectively passing all said bits comprising a said color code in a first mode, selectively passing at least some of said bits comprising a said color code as a single word in a second mode, and sequentially passing at least two words each comprising at least some of said bits comprising a said color code in a third mode;

a second interpreter coupled to said true color selector for selectively reversing a bit ordering of said words passed from said true color selector in said second and third modes, said second interpreter passing all said bits of data in received from said true color selector in said first mode; and true color output multiplexing circuitry coupled to said second interpreter circuitry and operable to select and output a plurality of multiple bit words of true color data from said bits passed from said second interpreter.

15. The color palette of claim 14 and further comprising shifting circuitry coupling said input terminals and said pseudo-color selector and operable to shift at least one bit in said ordering of said bits of data from a first position to a second position in relation to said ordered inputs of said selector.

16. The color palette of claim 14 wherein said first interpreter comprises an array of m selector circuits, wherein m is the number of said plurality of input terminals and the number of bits comprising said color codes, each said selector circuit having a first input activated in response to a first control signal and a second input activated in response to a second control signal, said first input of a nth one of said selectors receiving an nth one of said m bits of data and said second input of said nth one of said selectors receiving an (m−n)th one of said m bits of data, wherein n is an integer between 1 and m, said first interpreter operable to reverse said ordering of said m bits of data in response to said second control signal.

17. The color palette of claim 16 wherein said second interpreter comprises:

an ordered array of p selectors, where p is a positive integer less than m, an nth one of said selectors having a first input coupled to an nth one of said input terminals, a second input coupled to a (p−n+1)th one of said input terminals, an output, and at least one control input and wherein n is a positive integer between 1 and p;

an ordered array of m latches comprising first and second groups of p latches each, an input of an nth one of said latches in said first group coupled to said output of said nth one of said selectors and an input of an nth one of said latches in said second group coupled to a (p+n)th one of said input terminals; and control circuitry coupled said control terminals of said selectors and a clock input of each of said latches, said second interpreter is operable to selectively reverse said bit ordering of said p-bit words received from said true color selector in said second and third modes, said second interpreter passing said m bits of data in received from said true color selector in said first mode.

18. The color palette of claim 17 wherein said true color selector comprises:

an ordered array of p selectors, an nth one of said selectors having a first input coupled to an nth one of said input terminals, a second input, an output, and at least one control input;

an ordered array of m latches comprising first and second groups of p latches each, an input of an nth one of said latches in said first group coupled to said output of said nth one of said selectors, an input of an nth one of said latches in said second group coupled to a (p+n)th one of said input terminals, an output of said nth one of said latches in said second group coupled to said second input of said nth one of said selectors; and control circuitry coupled said control terminals of said selectors and a clock input of each of said latches, said control circuitry operable to control said selector circuitry such that in said first mode said latches latch m bits of data for each said m bit word received at said input terminals, latch one said p bit word in said second mode and sequentially latch two p-bit words in said third mode.

19. The color palette of claim 18 wherein said true color output multiplexing circuitry comprises:

a first multiplexer coupled to said second interpreter for selecting and outputting q bits of a said m bits of data received from said second interpreter circuitry in said first mode and q bits of each said p-bit word received in said second and third modes, of being a positive integer, said q bits comprising a q-bit word of red true color data;

a second multiplexer coupled to said second interpreter for selecting and outputting r bits of said m bits of data received from said second interpreter circuitry in said first mode and r bits of each p-bit word received in said second and third modes, r being a positive integer, said r bits comprising a r-bit word of green true color data; and a third multiplexer coupled to said second interpreter for selecting and outputting s bits of said m bits of data received from said second interpreter circuitry in said first mode and s bits of each p-bit word received in said second and third modes, s being a positive integer, said s bits comprising a s-bit word of blue true color data.

20. The color palette of claim 19 and further comprising delay circuitry coupling said true color multiplexing circuitry and said color palette output multiplexer, said delay circuitry operable to synchronize said words of true color data and color data words output from said memory.

21. A method for providing data format compatibility between a graphics processor system operating in a data format selected from the Big Endian and Little Endian formats and a color palette operating in the other one of the Big Endian and Little Endian formats, the graphics processing system including a video memory for storing a plurality of color codes defining a video image to be displayed as a plurality of pixels, each color code comprising a plurality of data words formatted in accordance with the selected format such that the data words comprising each color code have a corresponding word ordering and bits comprising each color code have a corresponding bit ordering, the method comprising the steps of:

reversibly coupling each color code from the video memory to the ordered input terminals of the color palette such that the word ordering of the color codes received by the color palette is compatible with the word ordering of the other one of said formats;

selectively reversing bit ordering of all the bits comprising the color codes; passing through all the bits comprising a each color code in a first mode;

passing through at least some of the bits comprising each color code as a data word having a bit ordering in a second mode;

sequentially passing through at least first and second data words each comprising at least some of the bits from each color code received and each having a word ordering in a third mode;

selectively reversing the bit ordering the data words passed through in the second and third modes; and selecting and outputing at least one multiple bit word of true color data from the bits passed through.

22. The method of claim 21 and further comprising the steps of:

generating at least one recall address having a bit ordering in response to each color code received;

selectively reversing said bit ordering of a said recall address;

a memory coupled to said selector and having a plurality of data storage locations, each said location having an associated said recall address, recalling a color data word written into a location in a color palette memory in response to the recall address from said selector; and selecting for output between the words of true color data and color data words recalled from the color palette memory.

* * * * *